United States Patent
Scheufler, Jr.

[11] Patent Number: 5,971,382
[45] Date of Patent: Oct. 26, 1999

[54] SELF LOCATING LOCATOR AND GAUGE

[76] Inventor: Richard A. Scheufler, Jr., 3209 Hartland Center Rd., Collins, Ohio 44826

[21] Appl. No.: 09/020,019
[22] Filed: Feb. 6, 1998
[51] Int. Cl.[6] .................................................. B23Q 1/00
[52] U.S. Cl. ............................. 269/47; 269/49; 269/48.1
[58] Field of Search ............................ 269/47, 49, 48.1; 33/542

[56] References Cited

U.S. PATENT DOCUMENTS

| | | | |
|---|---|---|---|
| 1,695,453 | 12/1928 | Carenter | 33/542 |
| 2,887,079 | 5/1959 | Wilson | 269/47 |
| 3,289,308 | 12/1966 | Trnka | 33/542 |
| 4,216,950 | 8/1980 | Mason et al. | 269/296 |
| 4,265,026 | 5/1981 | Meyer | 33/542 |
| 4,989,654 | 2/1991 | Berkeley | 269/100 |
| 5,115,847 | 5/1992 | Taber | 269/296 |

Primary Examiner—David A. Scherbel
Assistant Examiner—Lee Wilson
Attorney, Agent, or Firm—Jerry Semer

[57] ABSTRACT

The present invention is basically a device that can be used as a centering tool, clamp and/or a gauge for measuring the size of bores. The device is basically made up of six different components. The first being a housing. The housing has three pocket bores near it's top to take three spheres. These pockets are placed 120° from each other. First a spring is placed into the housing. Next a large diameter sphere or conical plug is then placed into the housing. Then three smaller spheres are placed into the housing. These smaller spheres are adapted to fit into the machine pockets above mentioned. To operate you simply place the bore of the work piece over the locator and press down. One would know that the bore is precisely located when one hears or feels the three spheres snap into place. The device can also be used to measure the size of a bore by adding a measurement device to measure the position of the large sphere within the housing. The position of the large sphere within the housing tells how far the three smaller spheres extend in or out of the housing. Thus one can use the device to measure the size of a bore. One can also replace the spring with a solenoid or hydraulic fluid.

20 Claims, 26 Drawing Sheets

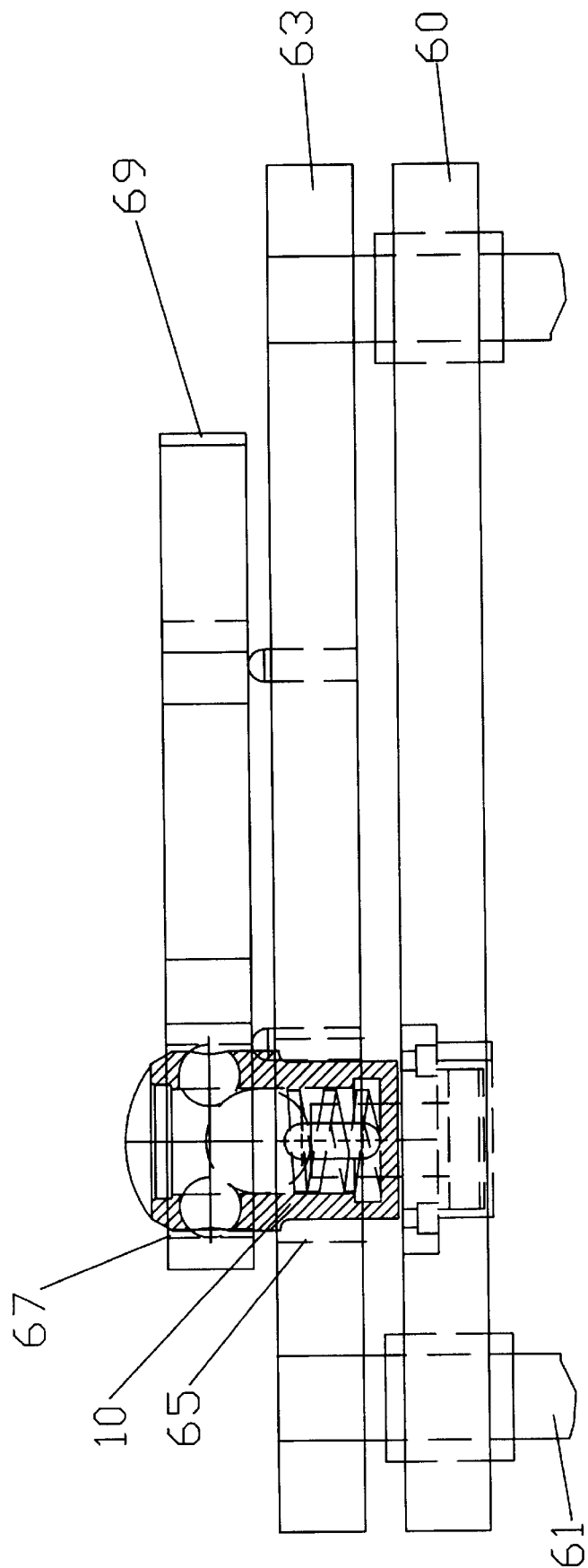

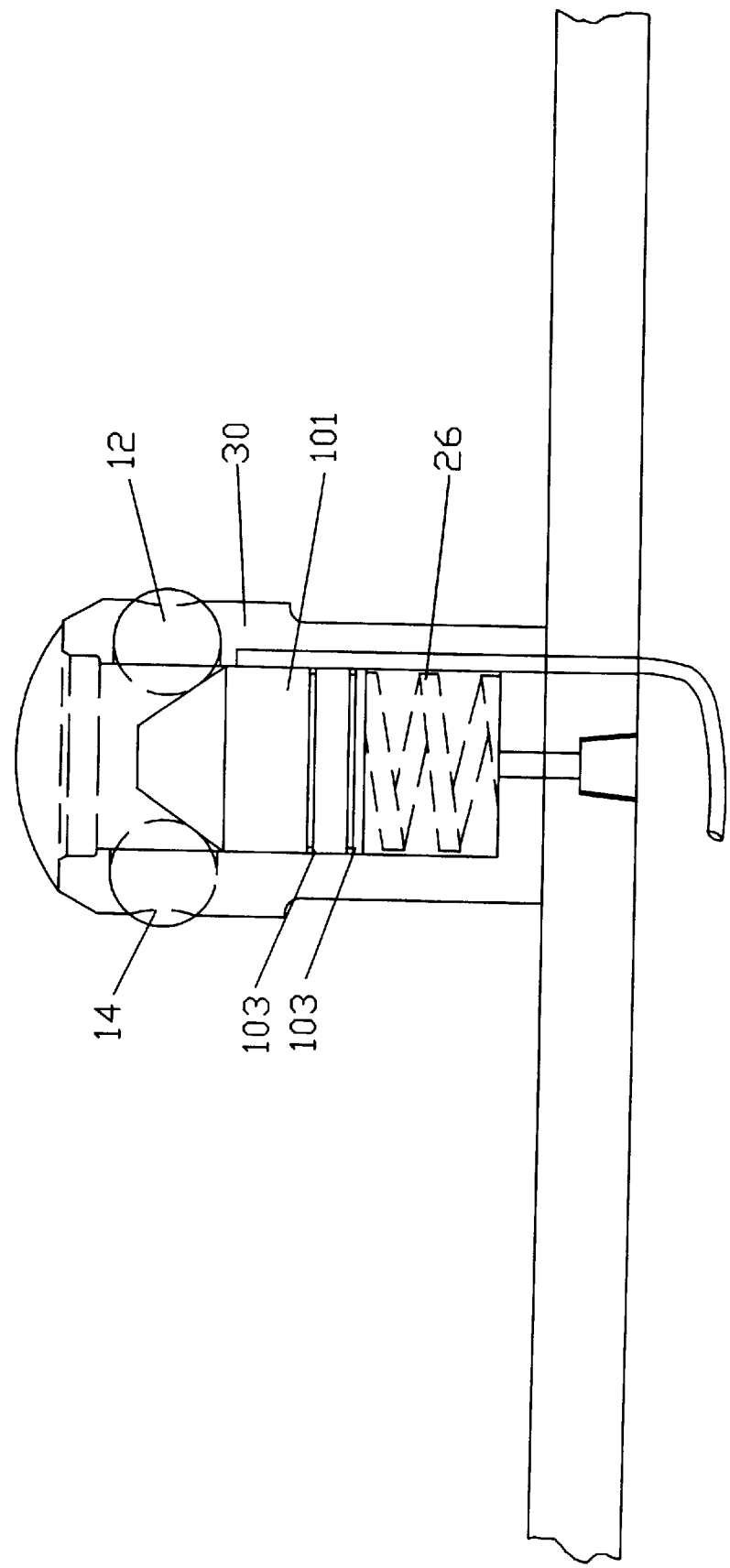

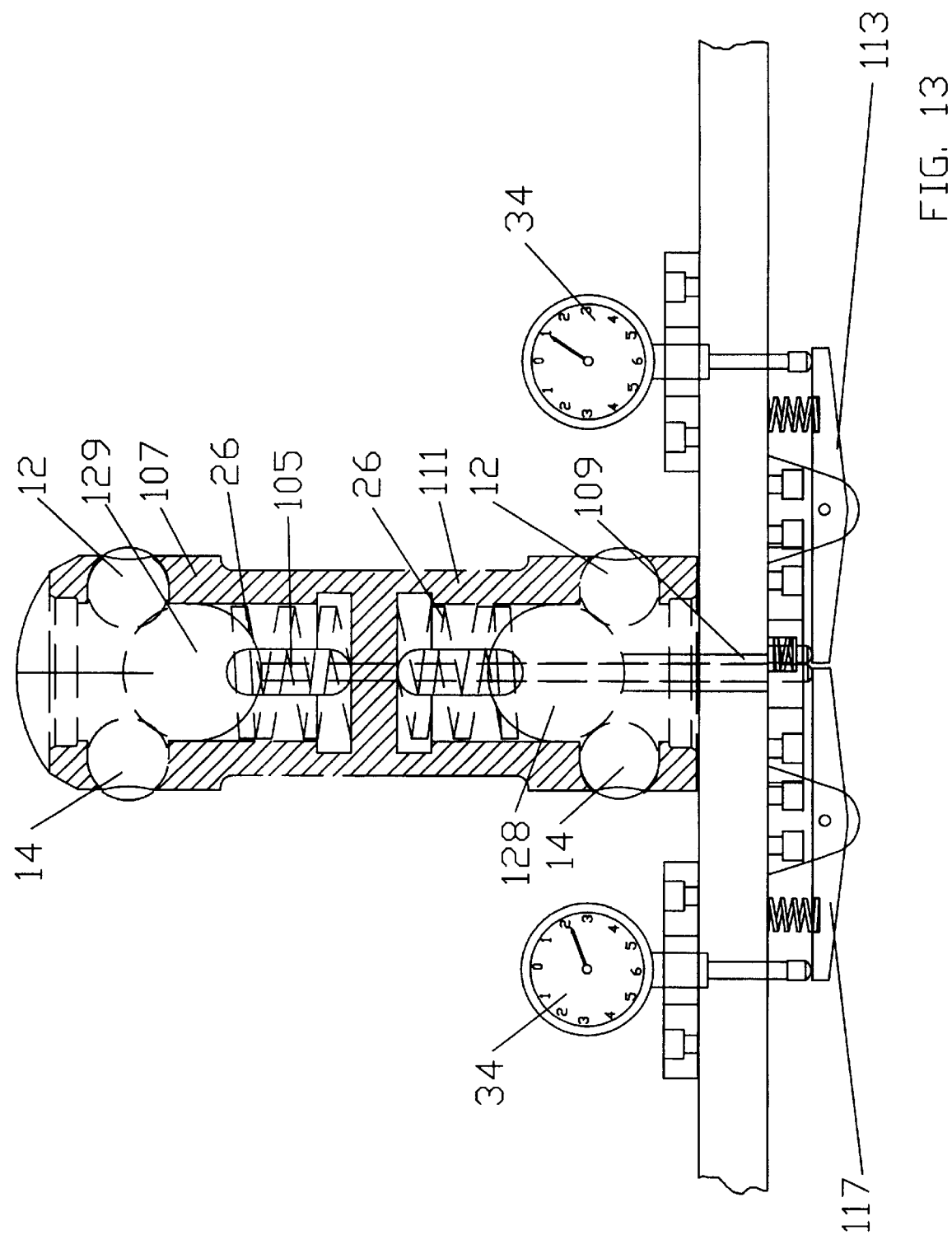

SELF LOCATING LOCATOR AND GAUGE

FIELD OF INVENTION

The present invention relates to a centering tool for precision centering cylindrical bores and pilots with respect to a selected reference point. Differing embodiments of the invention can precisely measure the bore and hold the work piece with the bore in place. An embodiment of the locator can center a shaft in a bore.

BACKGROUND OF THE INVENTION

Most locators on the market today have a conical head. These heads are solid body and when the head wears out the whole locator must be discarded. Thus, one of the objectives of this invention is to create a locator with interchangeable parts that only the part that wears out needs to be thrown away and the whole locator will work for a great number more cycles in the manufacturing process. Another problem with these locators are that one must insure that the locator is lined up perpendicular to the bore. If one is not precisely perpendicular to the bore the locator will mislocate the center. Thus one of the objectives of this invention to create a locator that will precisely locate the center of the work piece. Another problem with the old style locators is that the work piece need to be machined to a specific tolerance or will not perform properly. Thus one of the objectives of this invention is to create a locator that does not need a highly precise tolerance and has a much larger tolerance yet performs a more precise job of locating work piece. Also the tolerance of the work piece can be larger since the locator does a more precise job location. Another advantage of this invention that is not present in the previous art is that this locator can be ganged. In other words the locator can be used to locate the centers of two or more bores. Also one locator could be placed upon another locator to locate the centers of the two bores in which they fit. Also unlike previous art this locator can be used as a gauge to measure the precise diameter of a bore. It also could be ganged as a gauge and measure the diameter and taper of a conical surface. The invention has been designed to work in a dirty, high temperature environment at high temperature.

Another advantage of this invention that is not seen in the prior art is this invention can be spring loaded, hydraulic loaded, or electrically mechanically loaded. The invention can provide feedback as to the size of the bore. Further, this invention, unlike the previous art, can clamp the work piece into position and thus not only locate the work piece but hold it in position. The locator can be designed to not only locate a bore but also a shaft and a cylinder in a shaft.

SUMMARY OF INVENTION

The present invention is basically a device that can be used as a centering tool, clamp and/or a gauge for measuring the size of bores. The device is basically made up of six different components. The first being a housing. The housing has three pocket bores near it's top to take three spheres. These pockets are placed 120° from each other. First a spring is placed into the housing. Next a large diameter sphere or conical plug is then placed into the housing. Then three smaller spheres are placed into the housing. These smaller spheres are adapted to fit into the machine pockets above mentioned. To operate you simply place the bore of the work piece over the locator and press down. One would know that the bore is precisely located when one hears or feels the three spheres snap into place. The device can also be used to measure the size of a bore by adding a measurement device to measure the position of the large sphere within the housing. The position of the large sphere within the housing tells how far the three smaller spheres extend in or out of the housing. Thus one can use the device to measure the size of a bore. One can also replace the spring with a solenoid or hydraulic fluid.

SHORT DESCRIPTION OF THE DRAWINGS

FIG. 9A is a side view of a work table with the locator within the bore of the work piece.

FIG. 12 is another embodiment of the Self Locating Locator with a tapered nose plug.

FIG. 13 shows two Self Locating Locators that are used to measure the size of two bores.

DETAILED DESCRIPTION OF THE PREFERRED EMBODIMENT

Figure 1:
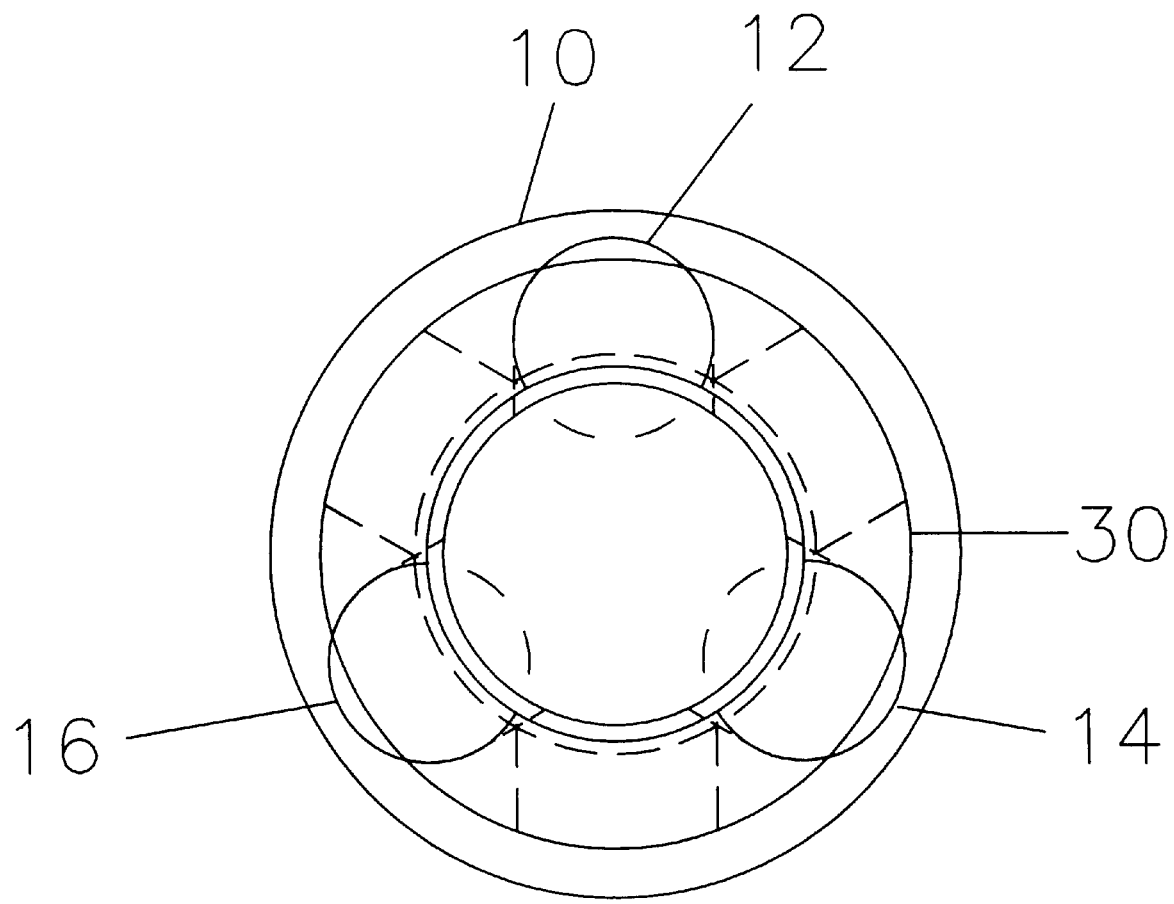
FIG. 1 shows the top view of the self locating locator.

FIG. 1 shows a top view of the self locating locator 10. From this view one can see the three small spheres 12, 14 and 16 which are located one hundred twenty degrees apart. These spheres 12, 14 and 16 extend past the outer edge of the housing 30 and make contact with the circumference of the bore.

Figure 2:
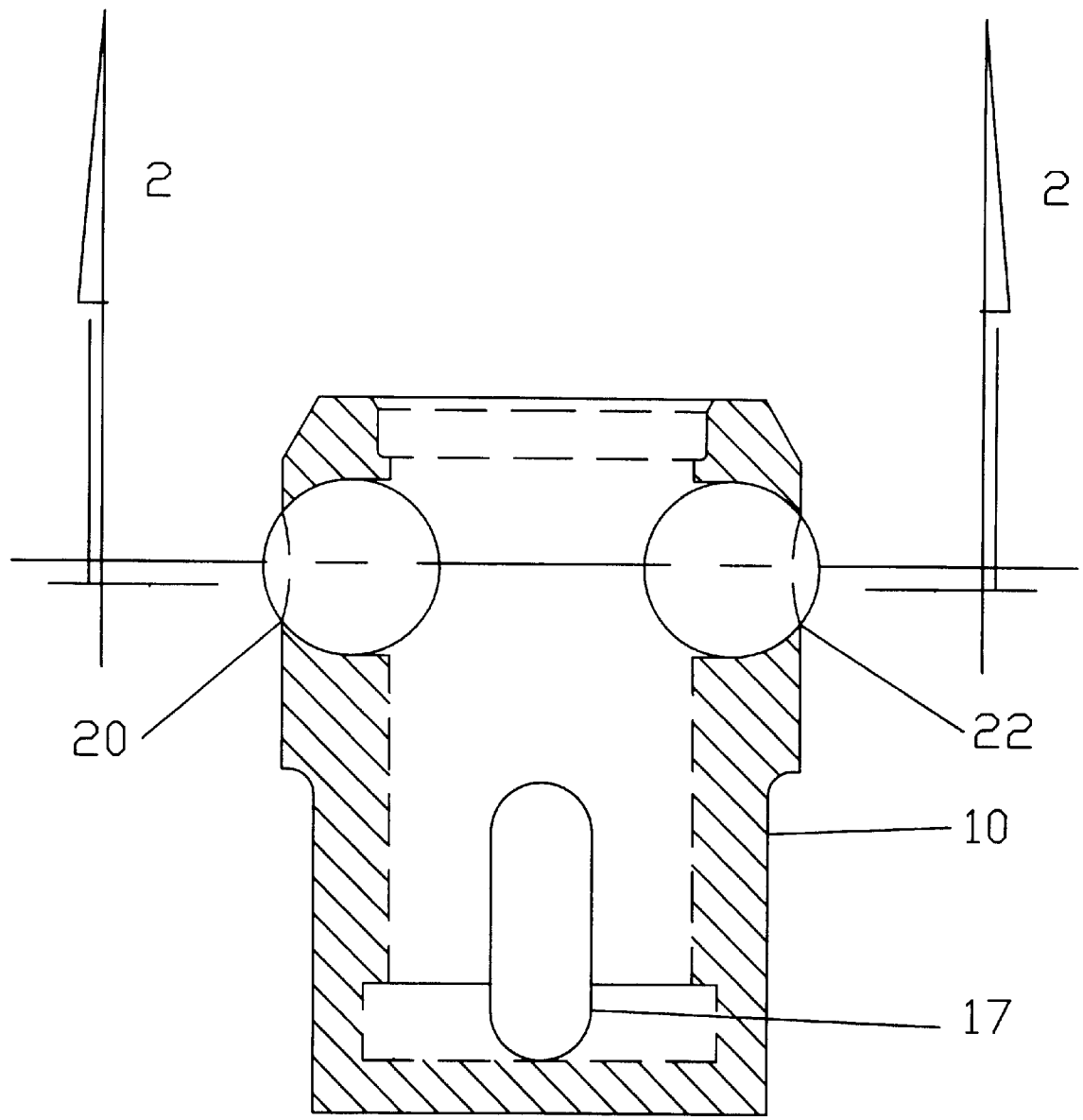
FIG. 2 is a cut away view of the housing of the Self Locating Locator with the inner parts removed.

FIG. 2 is a cutaway view of the housing 30. This cutaway view shows only the housing 30. All the other parts of the locator 10 have been removed. In this cutaway view one can see pockets 20 and 22 which have been precisely bored into the housing. Within these pockets the small spheres 12 and 14 are adapted to fit. This cutaway view shows opening 17 which is an opening that allows a rod or drift to be placed within the house to more easily remove the parts of the locator 10.

Figure 3:
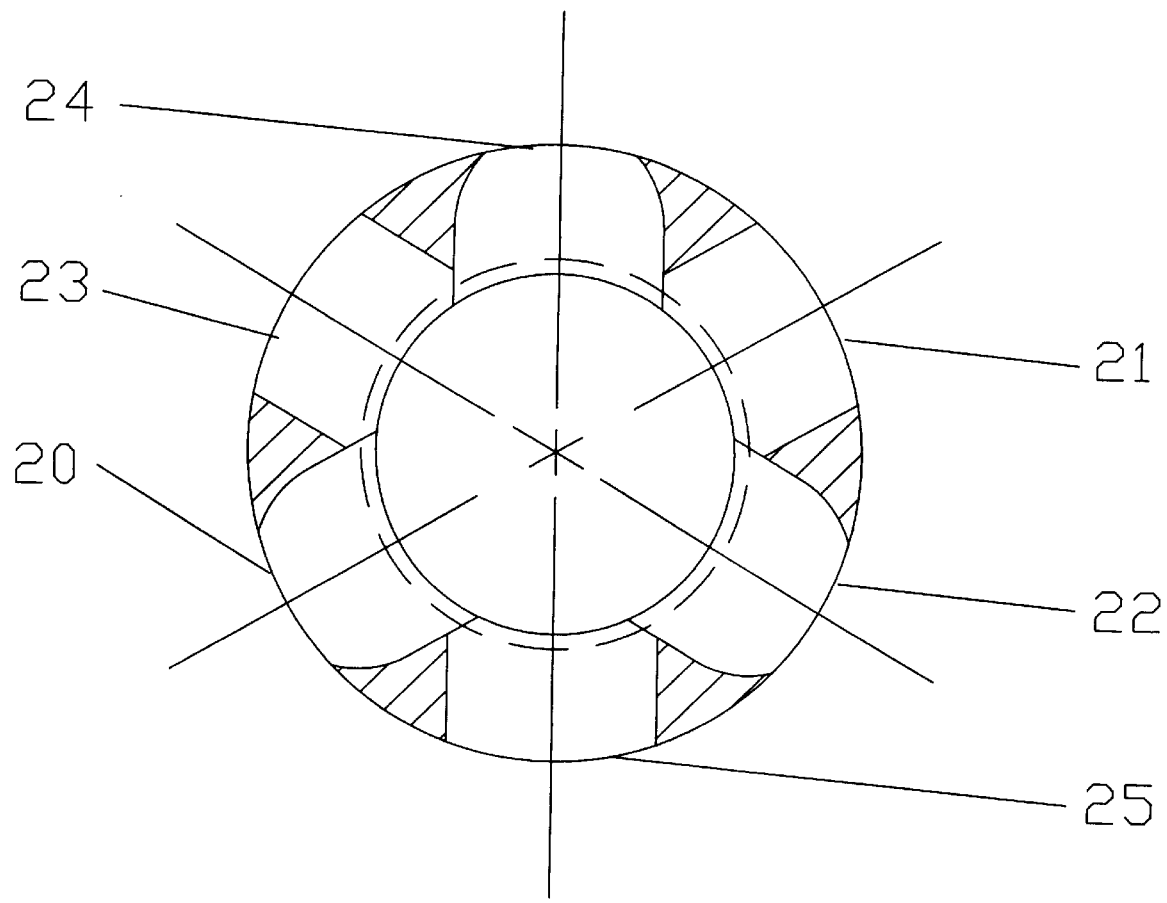
FIG. 3 is a sectional view of the housing on line 2—2 of FIG. 2.

FIG. 3 a sectional view of the housing 30 taken along line 2—2 of FIG. 2 shows that there are actually three pockets 20, 22 and 24 that have been precisely bored into the housing 30 for the three small spheres 12, 14 and 16. To precisely bore openings 20, 22, 24, openings 21, 23, and 25 must be made to allow the boring tool to pass through the housing. In the preferred embodiment these pockets are bored one hundred and twenty degrees from each other; however, it is not necessary to make the pockets 120 degrees apart. These pockets are also bored so that the small spheres 12, 14 and 16 are adapted to fit within the pockets. One can also see from FIGS. 1, 2 and 3 in the preferred embodiment that the housing is cylindrical with an open top and a closed bottom. The housing 30 can also be made with a semi open top to place a rod or other object through the top if so desire. This would be necessary in the case of making a gauge for measuring compression which will be described later.

Figure 4:
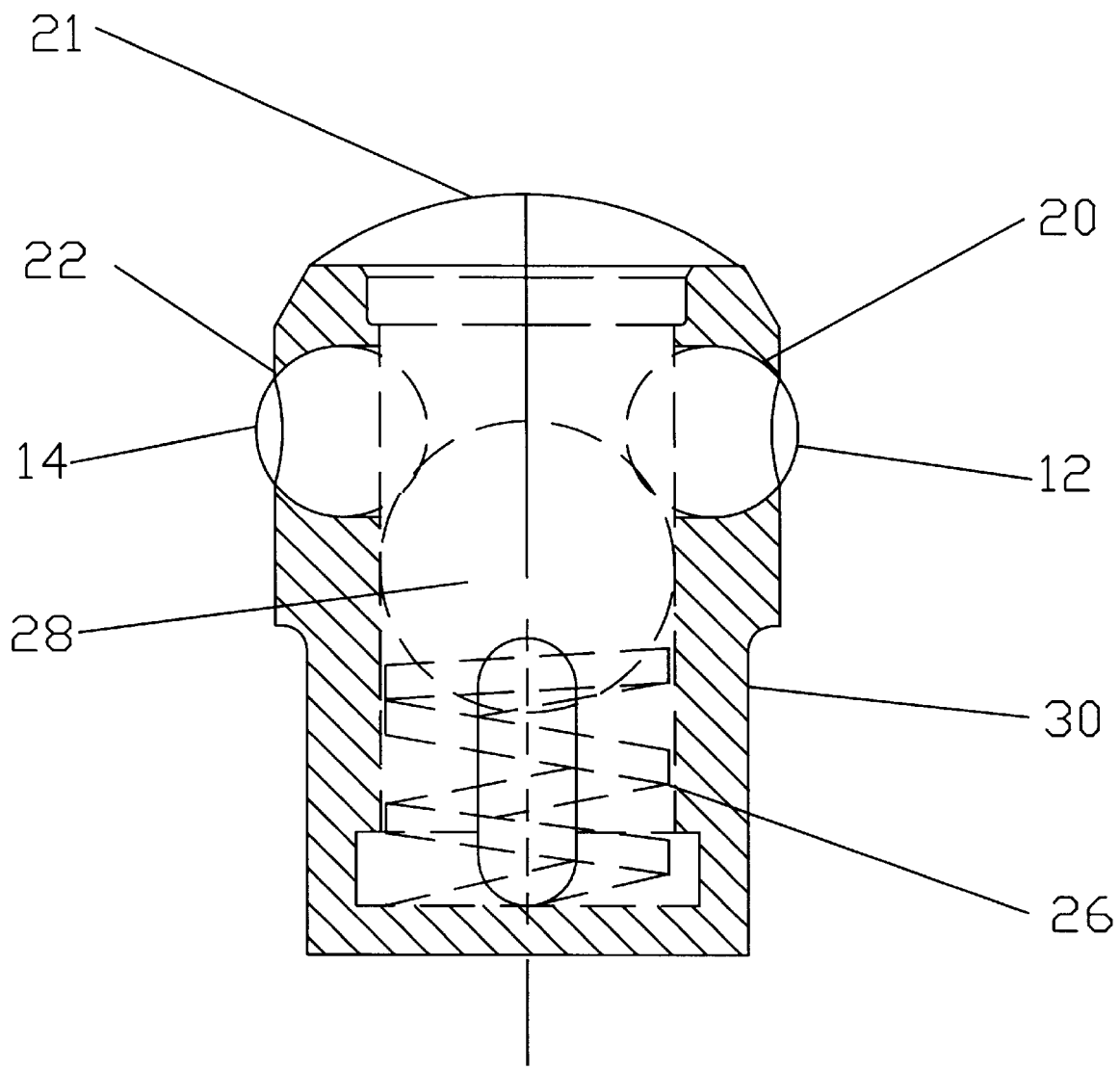
FIG. 4 is a cut away view of the Self Locating Locator with the inner parts.

FIG. 4 is a cutaway view of the locator of FIG. 1. FIG. 4 differs from FIG. 2 in that FIG. 4 shows the parts inside the locator. At the top of the locator 10 in FIG. 4 shows a spring 26 that fits against the bottom of the locator 10. On top of the spring 26 is placed a large sphere 28. Then the three small spheres 12, 14 and 16 are placed into the housing 30 in the pockets 20, 22 and 24 that have been precisely ground for those spheres 12, 14, and 16. The spring 26 places pressure on the large sphere 28 which in turn put pressure on the three small spheres 12, 14 and 16 that holds those spheres in there respective pockets 20, 24 and 22.

The theory behind the operation of this device is that pressure from spring 26 is placed upon the large sphere 28. Since sphere 28 and the three spheres 12, 14, and 16 are also spherical and those three small spheres 12, 14, and 16 are placed one hundred twenty degrees from each other in the same plane, the pressure from spring 26 placed upon large sphere 28 will be equally distributed to each of the small spheres 12, 14, and 16. Before the locator 10 is placed within the bore 11 the small spheres 12, 14, and 16 extend out past the circumference of the bore. As the locator is being placed within the bore, the bore pushes the spheres 12, 14, and 16 into the housing 30. Once within the bore the pressure of the spring on the large sphere 28 will be equally distributed between the small spheres 12, 14, and 16 and thus the small spheres will protrude out of the housing 30 equally thus centering the Work piece.

The self locating locator 10 is very simple to operate. One places the bore over the locator 10 and presses down. The self locating locator 10 locates the work piece automatically. One knows precisely when the work piece is located when the small spheres 12, 14 and 16 snap into place.

Figure 5:
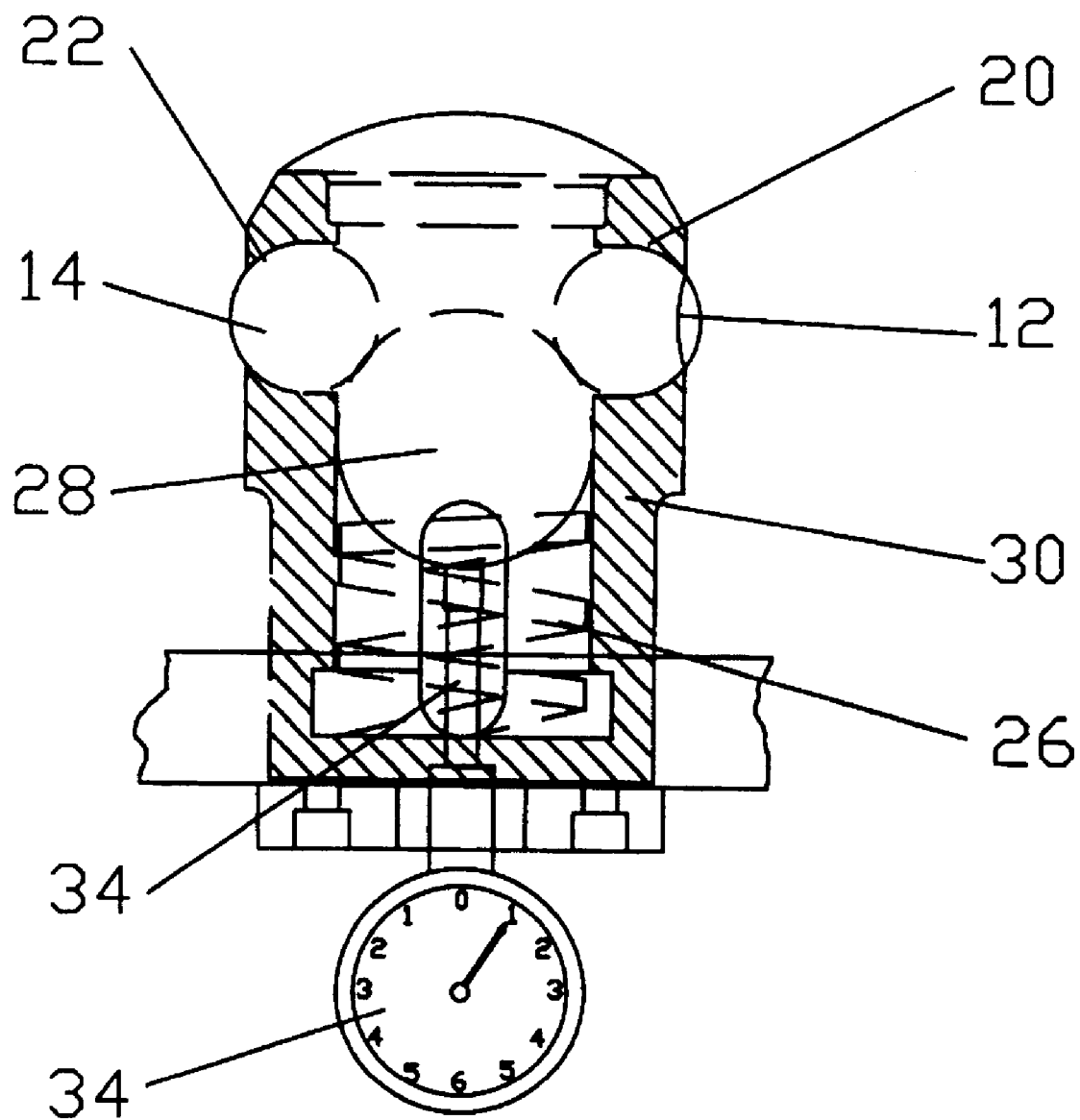
FIG. 5 is a cut away view of another embodiment of the Self Locating Locator showing the locator as a gauge.

FIG. 5 shows another embodiment of the invention. In this embodiment the locator 10 is used to measure the size of the bore. As in the previous embodiment there is a housing 30 which has three pockets 20, 22, and 24 bored into the housing at the top of the housing. These pockets 20, 22, and 24 are adapted such that the hold three small spheres 12, 14, and 16. These pockets 20, 22, and 24 are bored one hundred twenty degrees from each other and are all in the same plane. These pockets are bored so that the small spheres 12, 14, and 16 are adapted to fit within the pockets and extend beyond the outer perimeter of the housing 30. As in the previous embodiment within the housing is also a spring 26 that fits against the bottom of the housing 30 and on top of the spring 26 is placed a large sphere 28. The three small spheres 12, 14, and 16 are then placed within the pockets 20, 22, and 24. The pressure of the spring on the large sphere 28 forces the large sphere 28 to move upward and put pressure on the small spheres 12, 14, and 16 and forces them into the pockets 20, 22, and 24 and to extend beyond the outer perimeter of the housing 30. Since the large sphere 28 is spherical it puts equal pressure on the three smaller spheres 12, 14, and 16. Thus spheres 12, 14, and 16 extend outward past the perimeter of the housing 30 equal distance. In this embodiment a small opening is made in the bottom of the housing 30 and a bar 32 is extended into a housing up and against the large sphere 28. This bar 32 moves up and down as large sphere 28 moves up and down. Attached to bar 32 is indicator 34. Meter 34 measures the distance bar 32 moves. When the locator is placed within a bore the three small spheres 12, 14, and 16 are forced inward. Since as I put forth previously the locator locates itself within the center of the bore the three small spheres 12, 14, and 16 are pressed inwardly equal distance. Since these three spheres put equal pressure upon the large sphere 28 and forces it downward. That in turn forces rod 34 downward. The movement of rod 24 is measured by indicator 34. Thus one can precisely tell how far the small spheres 12, 14, and 16 are pressed inward when one places the locator 10 in the bore thus enabling one to figure the exact size of the bore.

Figure 6:
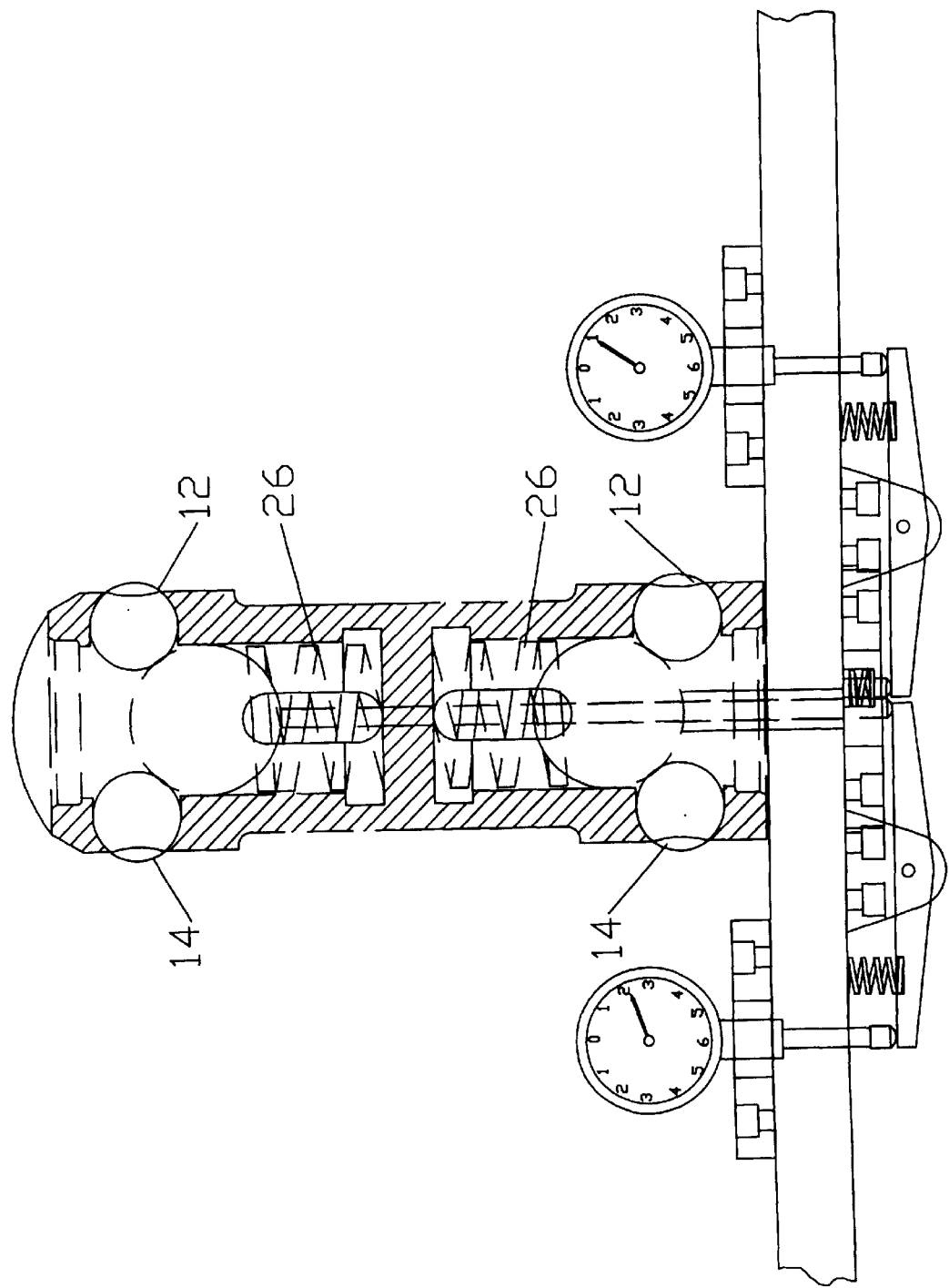
FIG. 6 is another embodiment of the Self Locating Locator used as a guage to measure the size of two bores or a taper.

The self locating locator can also be designed to locate two different sizes of bores as shown in FIG. 6. In this figure two locators 10 are used to locate the centers of two different sizes bores. The two locators are placed one on top of the other and are placed within the two bores. These locators work the same as the locators in the above embodiment and thus find the center of the two bores. The large sphere 28 in both locators puts equal pressure on the three smaller spheres 21, 14, and 16 pushing them out against the circumference of the bore. As I stated above when the pressure is equal on all three of the small spheres 12, 14, and 16 then the locator is located. In the case in which there are two or more locators each having the three spheres the large sphere places pressure on the small spheres and thus pushes them out to a point equalizing the pressure on all the spheres and thus can precisely locate the center of the two or more bores.

Figure 7:
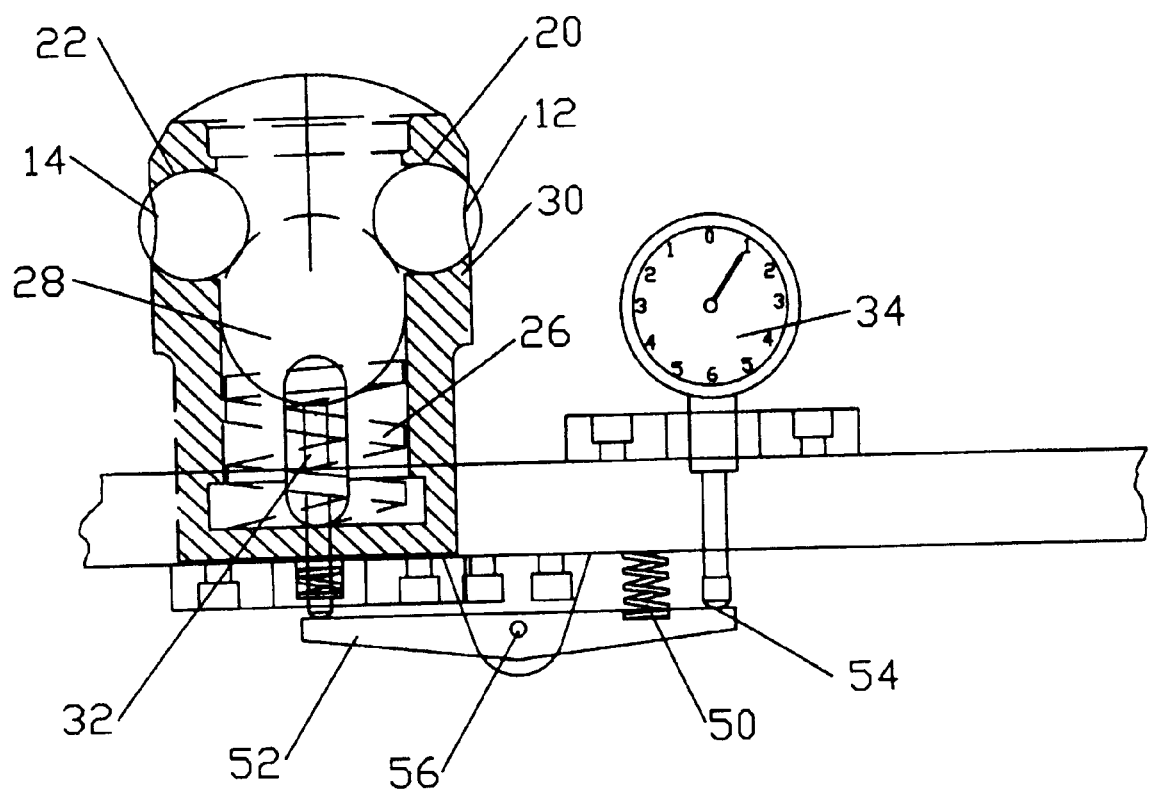
FIG. 7 is a cut away view of another embodiment of the locator being used as a gauge.

The locator 10 in FIGS. 6 and 7 can also be used to measure the taper of a bore. In this case we have two locators being used as a gauge. Thus the gauge can read the diameter of the tapered bore for each of the locator's positions in the taper. One can move the locator up and down and get readings at different points in the taper. With these diameters one could easily compute the taper of the opening. One could also move a single locator up and down and get reading at different points in the taper.

FIG. 7 shows another embodiment of the gauge of FIG. 5. FIG. 7 embodiment is built the same way as FIG. 5 except instead of the bar 32 being attached to the gauge, the bar 32 is attached to a lever which activates the gauge. The preferred embodiment shows the housing 30 with the three pockets 20, 22 and 24 bored into the housing at the top of the housing 30. These three pockets, 20, 22, and 24 are adapted such that they hold three small spheres 12, 14 and 16. As in the previous embodiment within the housing is also a spring 26 that sits up against the bottom of the housing 30 and on top of the spring is placed a large sphere 28. The three smaller spheres 12, 14 and 16 are in contact with large sphere 28 and as the three small spheres 12, 14 and 16 move in and out of the housing 30 corresponding to the size of the bore, the three small spheres make contact with the large sphere moving it up and down. Bar 32 is placed in contact with large sphere 28 and as large sphere 28 moves up and down, bar 32 moves up and down. Bar 32 is in contact with one end 52 of lever arm 50. The other end 54 of lever arm 50 is in contact with meter 34. When the large sphere 28 moves, bar 32 moves which moves lever arm 50. As one end 52 of lever arm 50 is moved up and down by the rod, this movement is transferred through fulcrum 56 to the other end of the lever arm 54 in contact with the meter 34. Thus, as the large sphere 28 moves up and down, the meter 34 measures its movement. When the locator is placed in the bore, the small spheres 12, 14 and 16 will move inward putting pressure upon the large sphere 28 and moving it downward. This movement will be transferred to the bar 32 which transfers the movement to the arm 50. The movement through the lever arm 50 is transferred to the meter 34 which measures the distance. The small spheres 12, 14 and 16 have been forced inward and thus, one can tell the size of the bore. It should be noted that the embodiment shown in FIG. 5 and FIG. 7 can not only measure the size of the bore but also can be used to locate the bores center.

Figure 8:
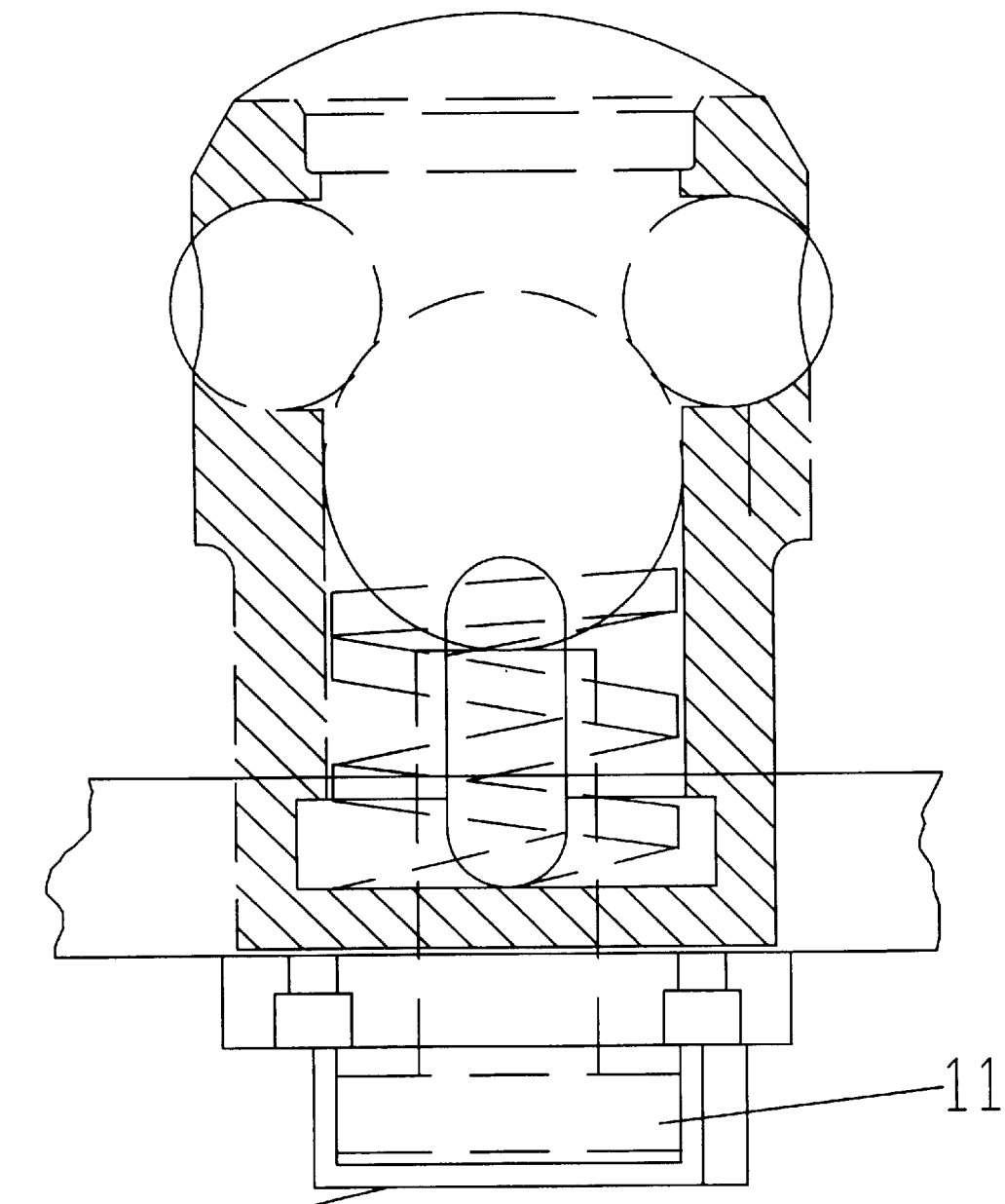
FIG. 8 is a cut away view of the Self Locating Locator with hydraulic measurement of the movement of the small balls.

FIG. 8 shows another embodiment that can both locate and measure the size of the bore. In this embodiment, the locator works exactly the same as in FIGS. 5 and 7. However, a plunger 11 which makes contact with the large sphere 28. The plunger 11 is attached to a hydraulic cylinder 13. Thus, as the large sphere 28 moves up and down to the movement of the small spheres 12, 14 and 16 in and out, the plunger 11 also moves up and down and changes the location of the piston of the hydraulic system. Thus it is easy to measure the movement of the large sphere 28 by a measurement of the amount of piston movement. One could also use an electronic means to measure the movement of the large sphere 28. In the simplest form of the electronic means the rod would be attached to some type of solenoid or electromagnetic measuring device. Thus, as the small spheres 12, 14 and 16 move in and out, the large sphere 28 would move up and down moving the rod 32 which would be measured by an electromagnetic device.

The embodiment of FIG. 8 can also be used to clamp a part in place. In this case a upward force would be placed on the plunger 11 thus forcing the plunger 11 to put force on the large sphere 28 upward and force the large sphere 28 upward would put a force on the three small spheres 12, 14 and 16 and drive them outward against the bore. The friction of the three small spheres 12, 14 and 16 against the bore would hold the work piece in place and clamp the work piece.

Figure 7A:
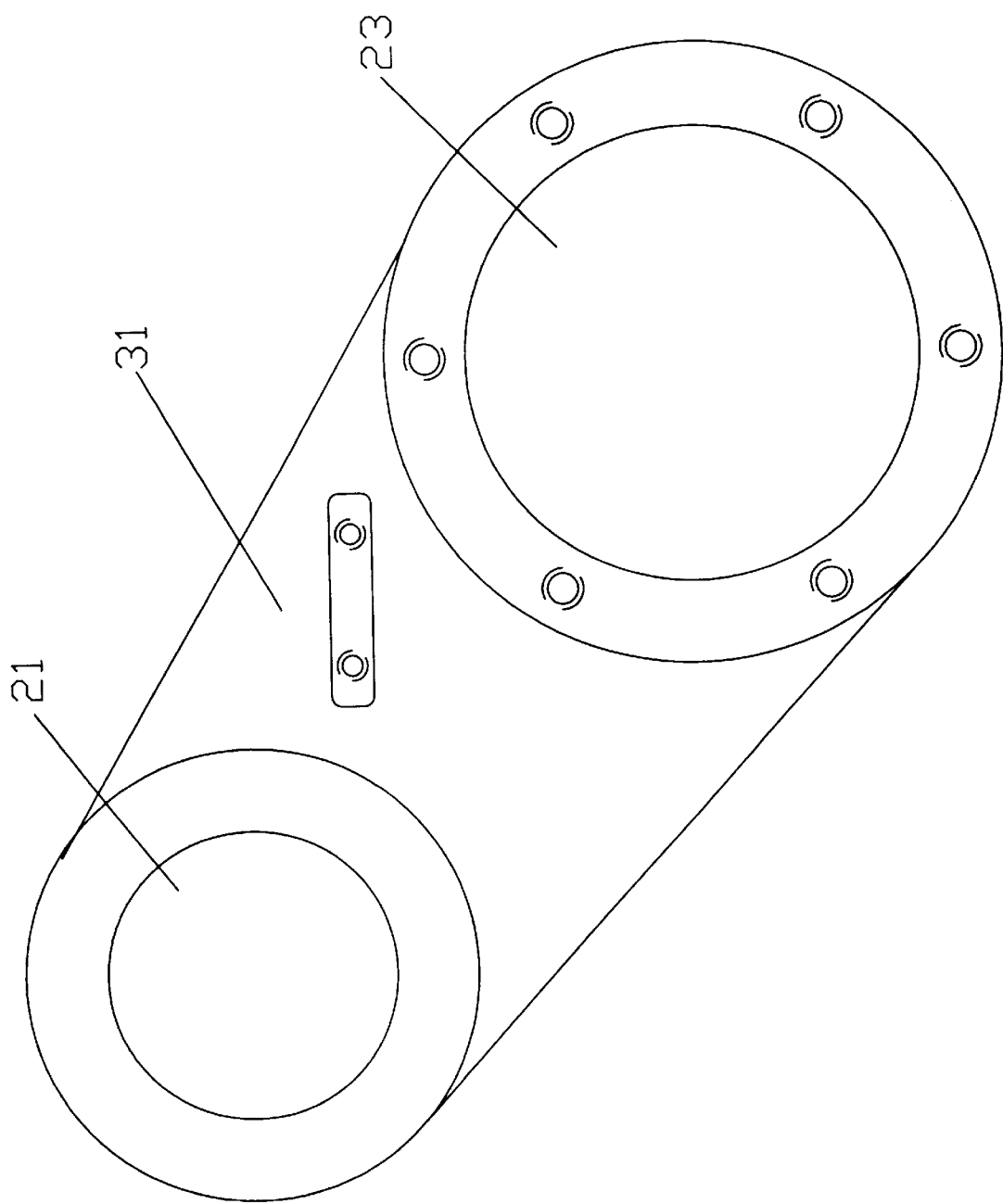
FIG. 7A is a top view of a work piece.
Figure 7B:
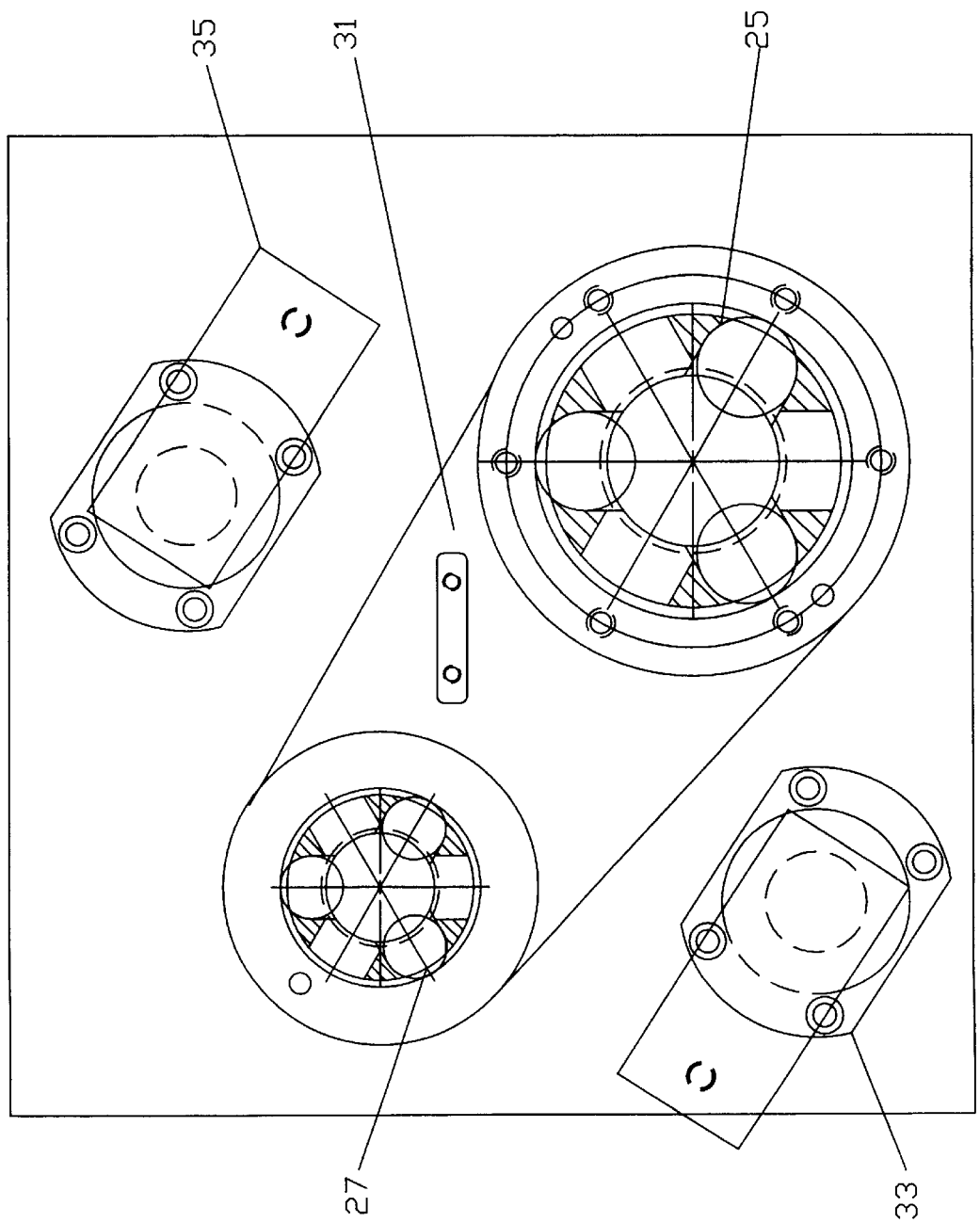
FIG. 7B is a top view of a work piece table with the work piece in place and two locators locating the work piece.
Figure 7C:
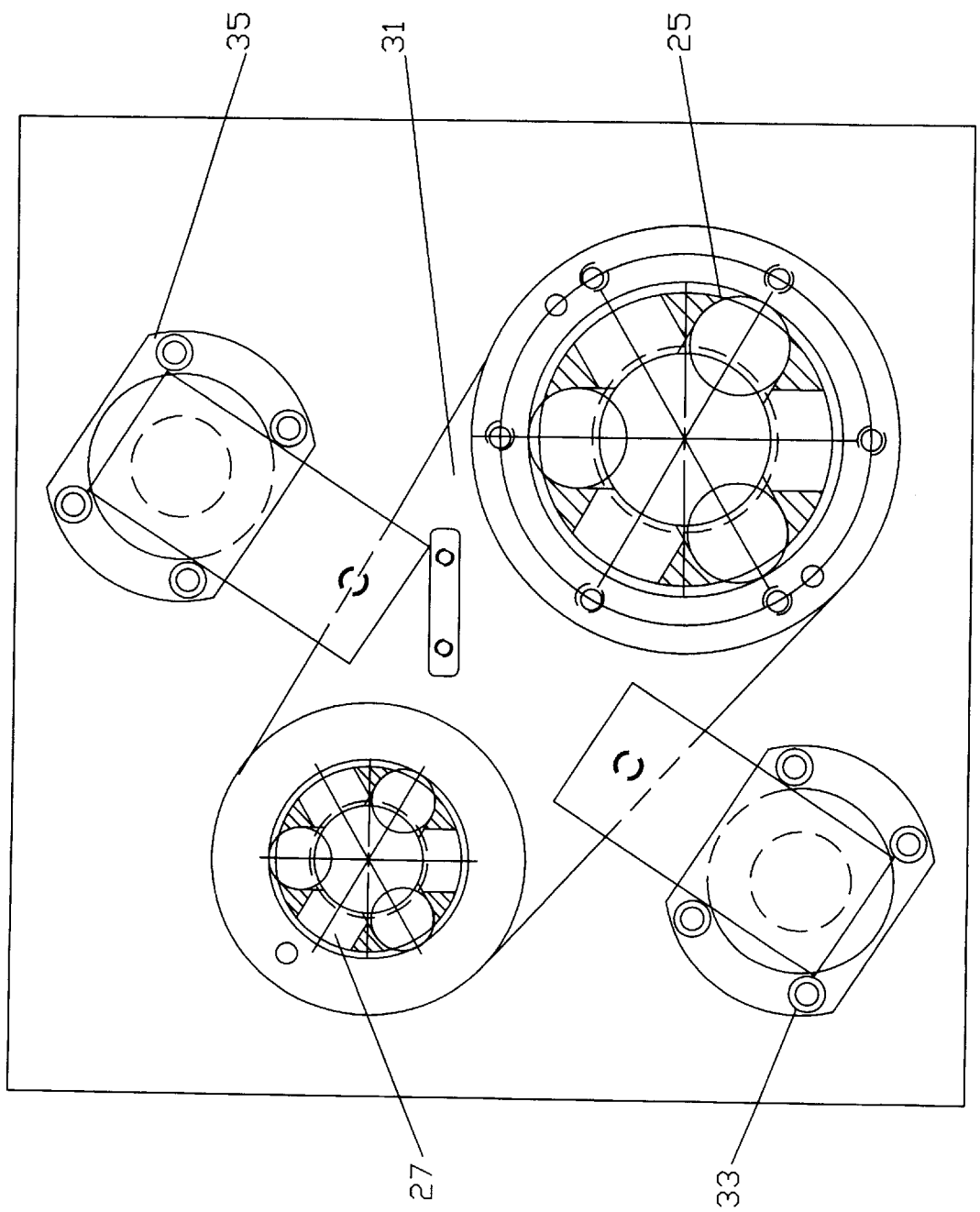
FIG. 7C is the top view of the same work piece and locators of FIGS. 7A and 7B with the work piece clamp.
Figure 8A:
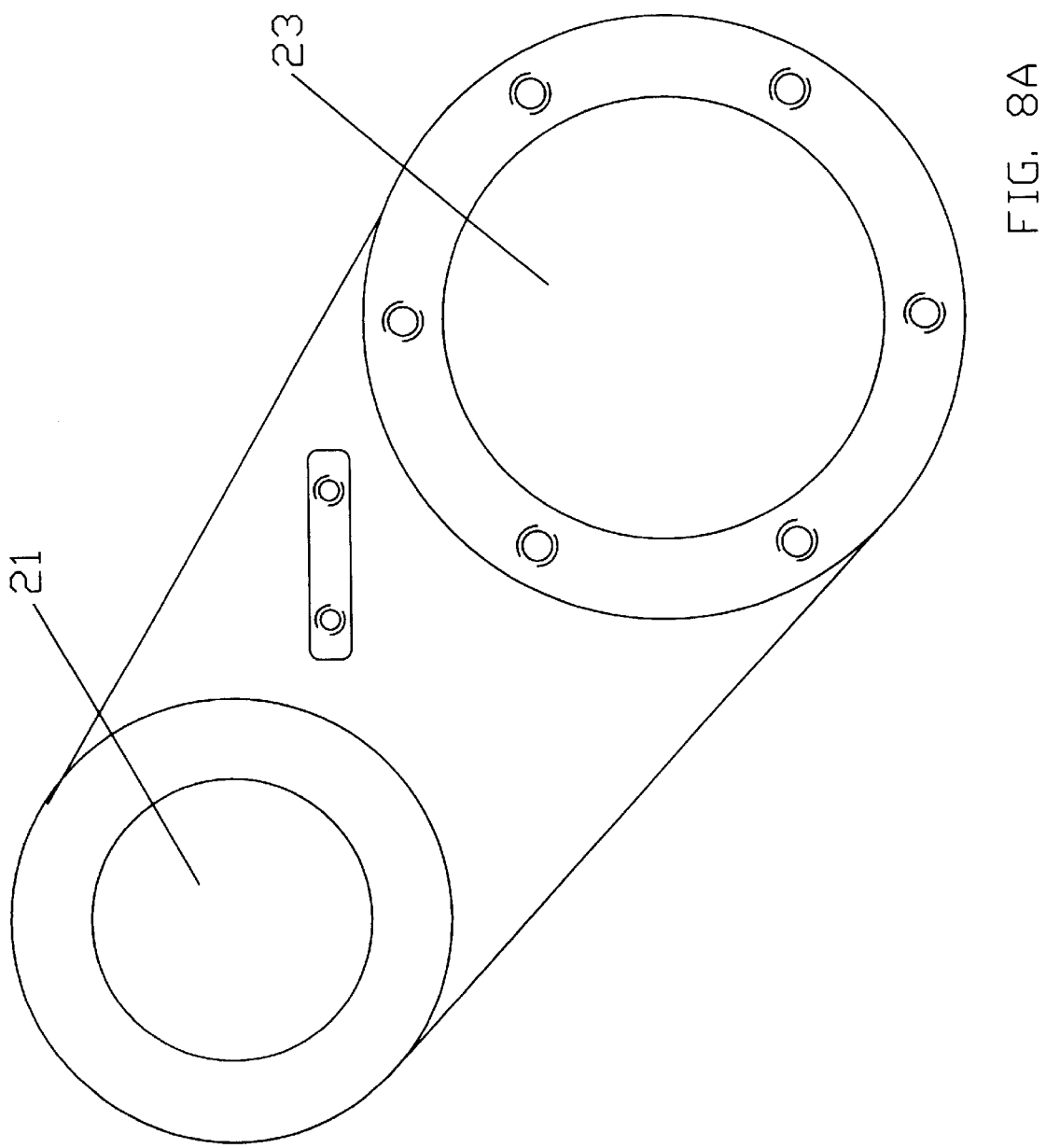
FIG. 8A is the top view of a work piece.
Figure 8B:
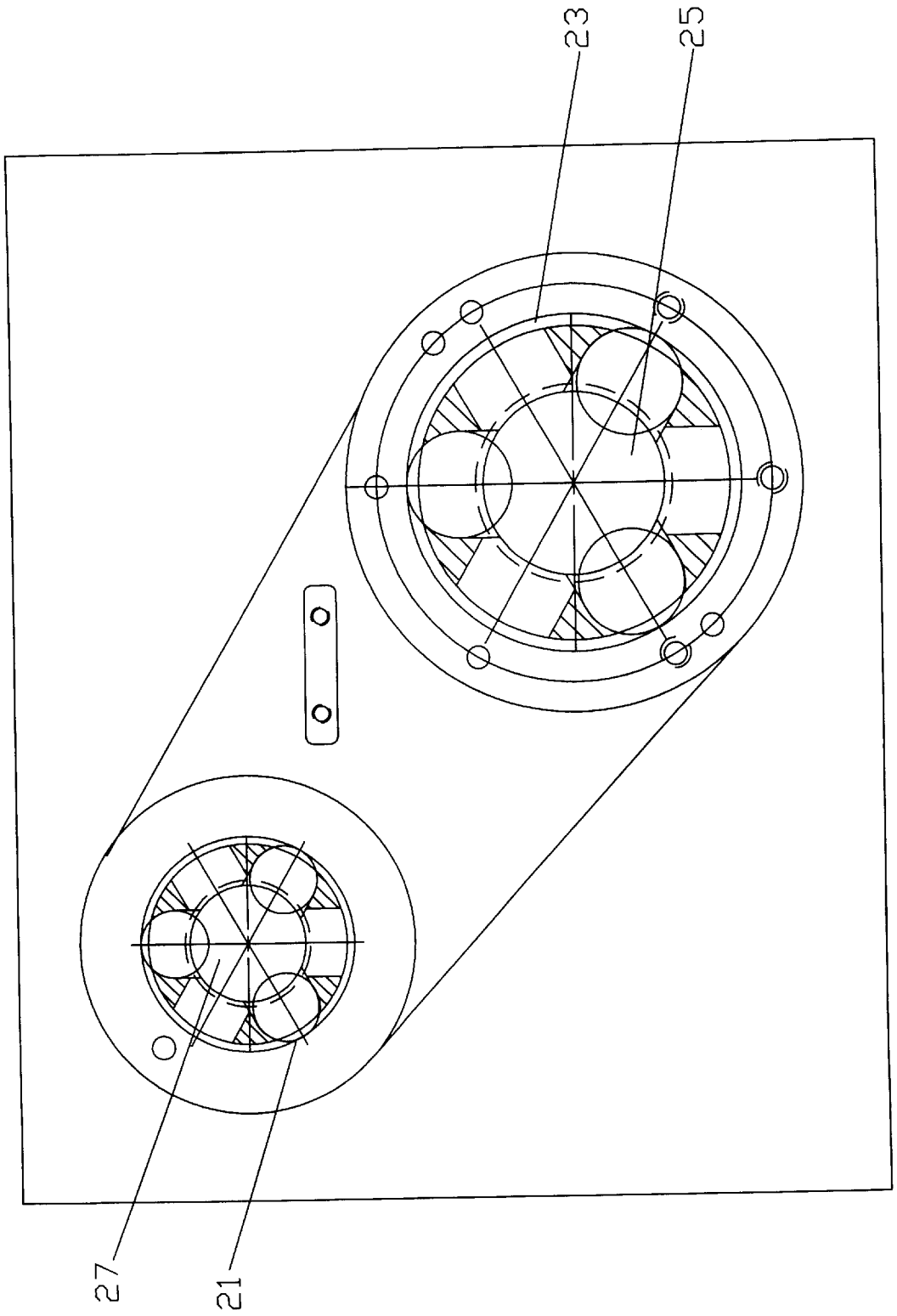
FIG. 8B is the top view of a work piece on a work table with locators locating the work piece and clamping it in place.

The locator can be used to locate a work piece on a jig. As shown in FIGS. 7a, 7b and 7c, two bores 21 and 23 within the work piece 31 are located by two different locators 25 and 27. The work piece 31 is placed over the two locators 25 and 27. Locator 25 is in bore 23 and locator 27 is in bore 21. The center of the bores are located and then the work piece 31 is clamped into place by clamps 33 and 35. By using these two centers, one is able to locate other points on the work piece for machining. FIGS. 8a, 8b and 8c are exactly the same as FIGS. 7a, 7b and 7c, however, in this case the two locators are pneumatically, hydraulically, electronically driven and thus the locators can be used not only to locate the work piece, but clamp it in place. In FIG. 8b there are no clamps as in 7b and 7c. Further, the locators in both FIGS. 7 and 8 can be used to measure the size of the bores.

Figure 9:
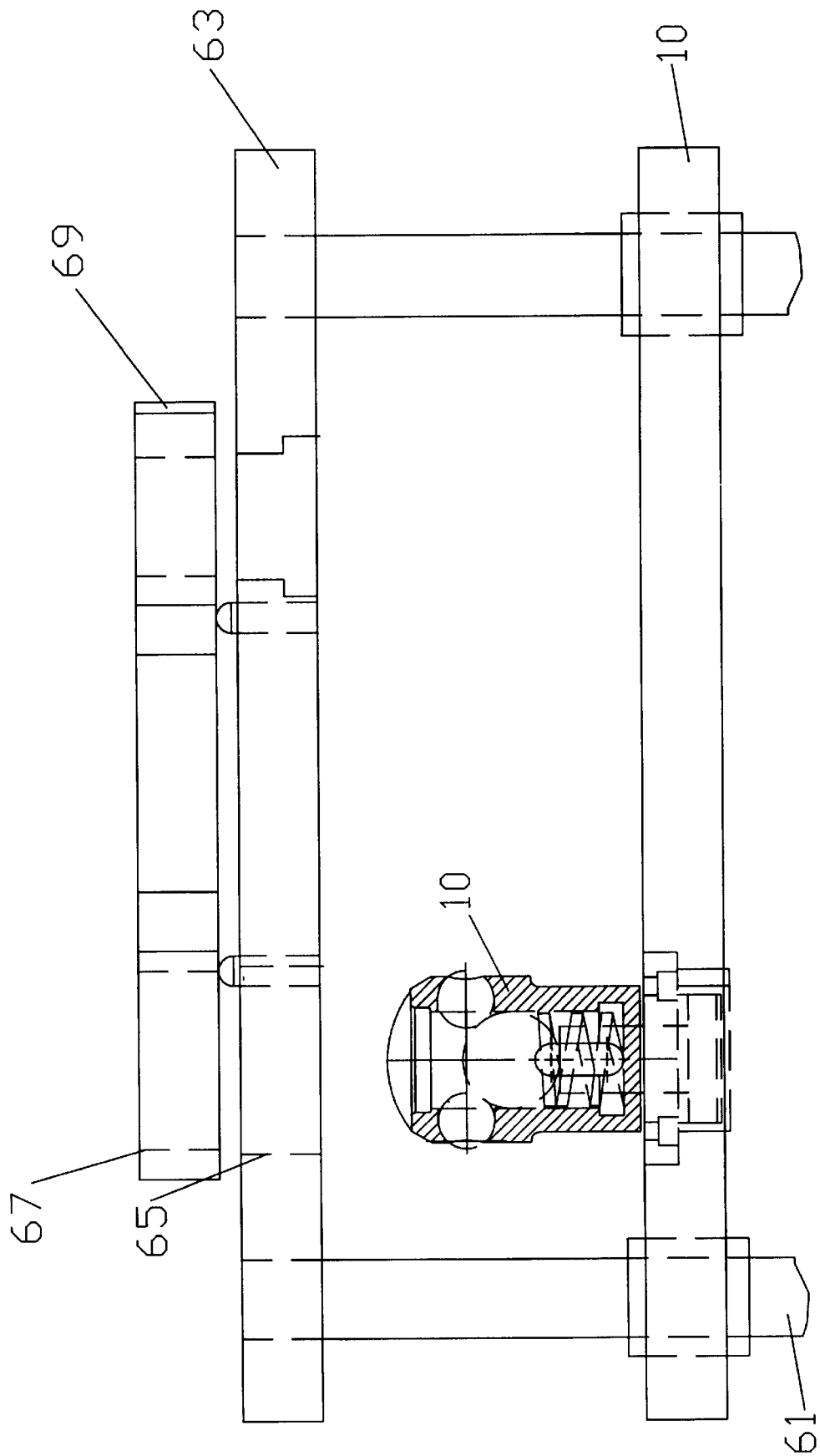
FIG. 9 is a side view of a work table with the locator underneath and the work piece in place.
Figure 10:
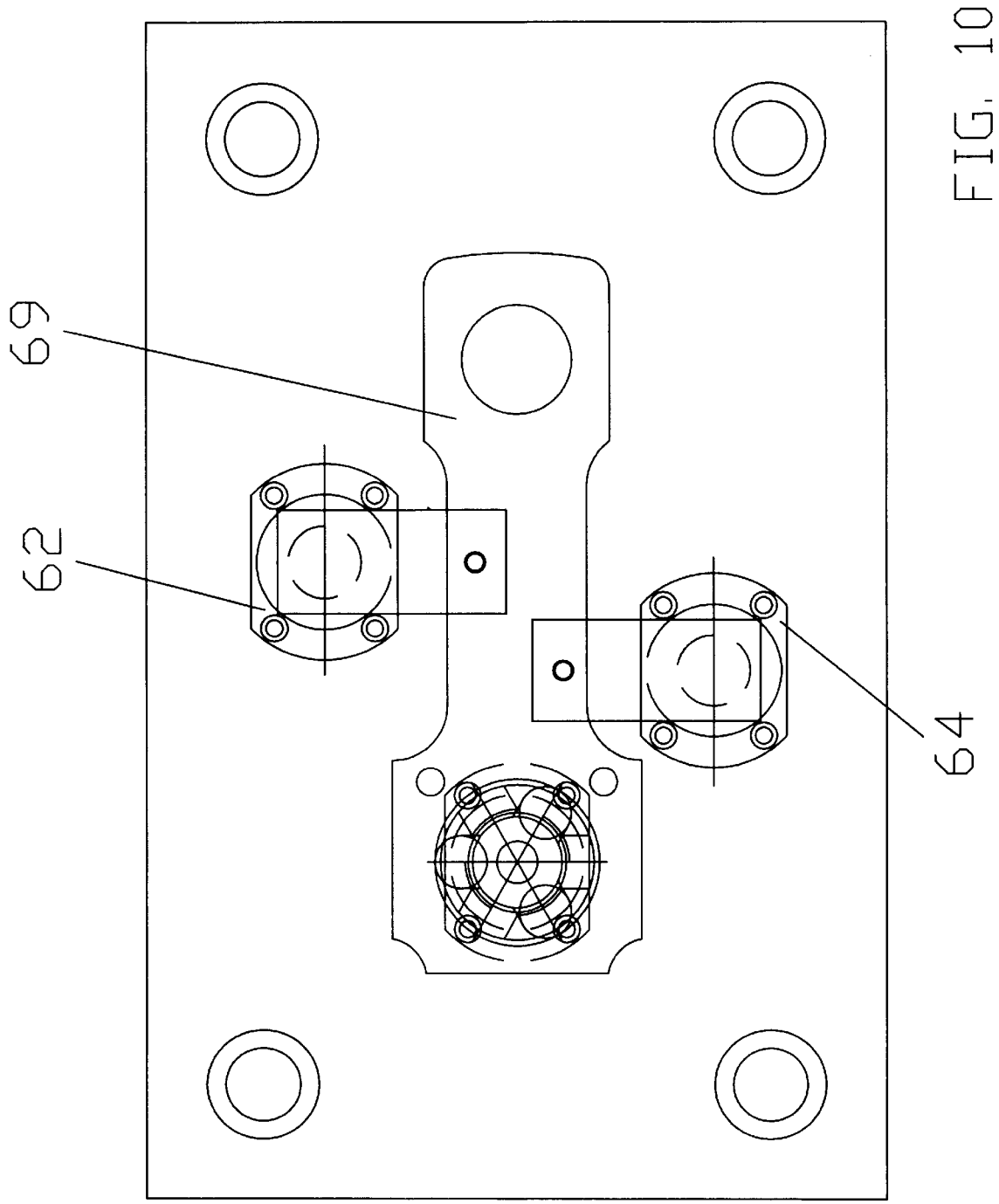
FIG. 10 is a top view of a work table with a work piece clamped in position with the locator within the bore.

FIGS. 9 and 9A shows how the locator can be used on a work station. In this case the locator 10 is mounted on plate 60. Plate 60 is located underneath the work piece table 63. Plate 60 is attached to the work piece table 63 in such a way that it can move up and down underneath the work piece table 63. In the preferred embodiment plate 60 is attached to the work piece tables legs 61 such that the locator 10 can be moved up and down and its centerline remains perpendicular to the work piece 69. An opening 65 in the work piece table allows the locator 10, when its in the up position shown in 9a, to move into the bore 67 of the work piece 69. When the locator 10 is in the down position as shown in FIG. 9 the locator 10 is fully underneath the work piece 69 and usually underneath the work piece table 63 so its out of the way. To use a locator 10 in FIG. 9 the work piece 69 is placed on the work piece table 63 and held down by holders 62 and 64 as shown in FIG. 10. The bore which the locator 10 is to locate is placed over the opening in the table through which the locator 10 passes. The locator 10 is moved up in position and locates the bore. Then the holders 62 and 64 are fastened down tight to hold the bore in position. Then the locator 10 is lowered and work can be done on the work piece 69.

Figure 11:
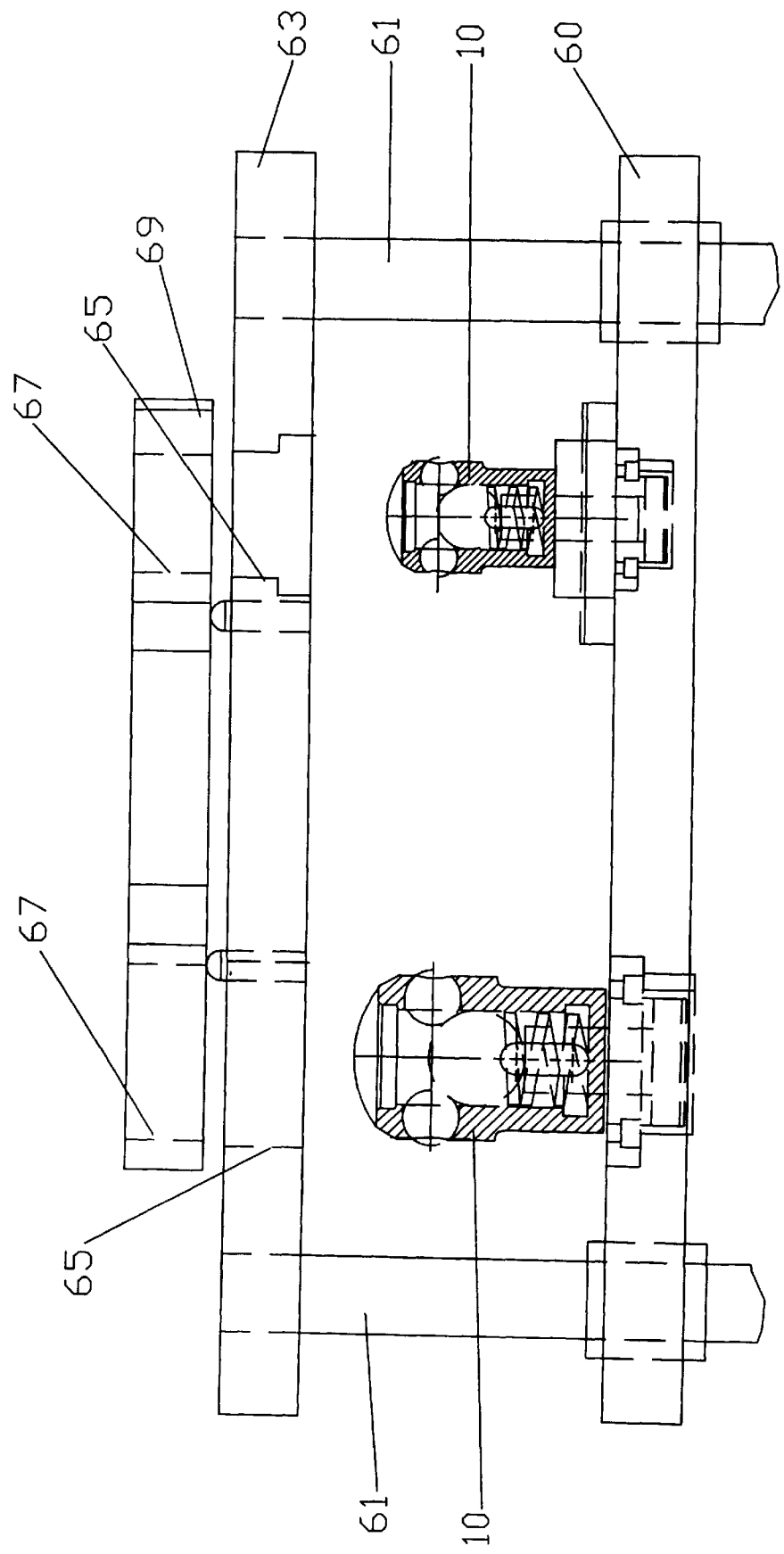
FIG. 11 is the side view of a work piece table with two locators below and the work piece in place.
Figure 11A:
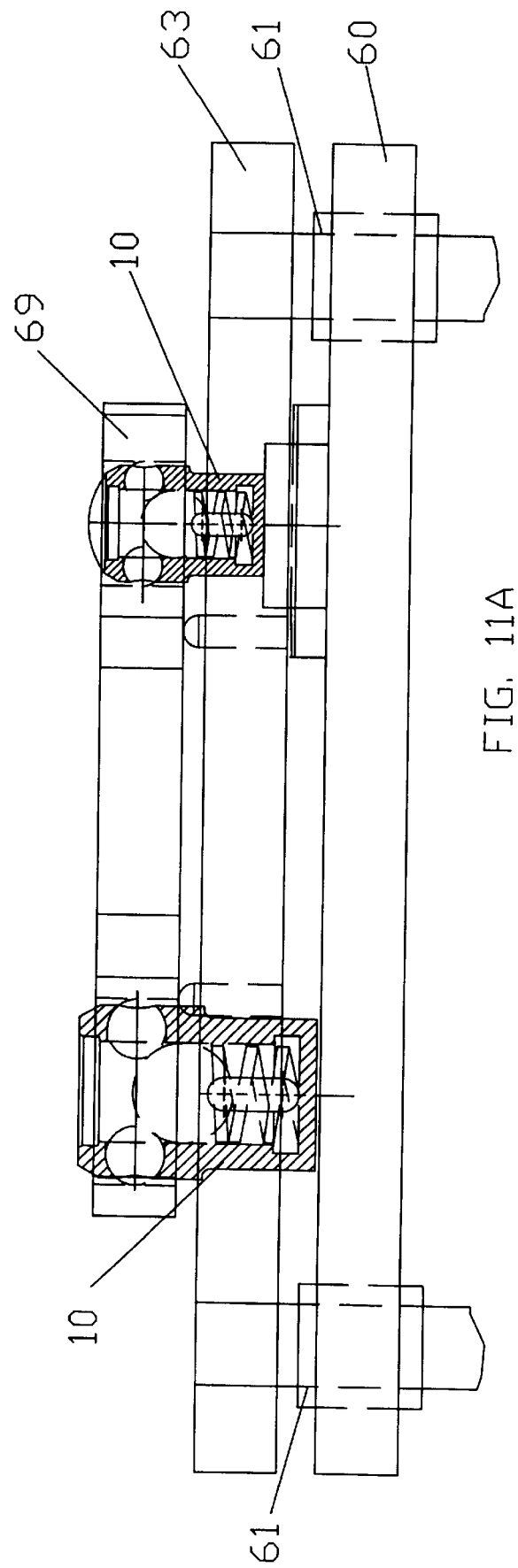
FIG. 11A is a side view of a work table with the two locators of FIG. 11 moved up within the bores locating the work piece table.
Figure 11B:
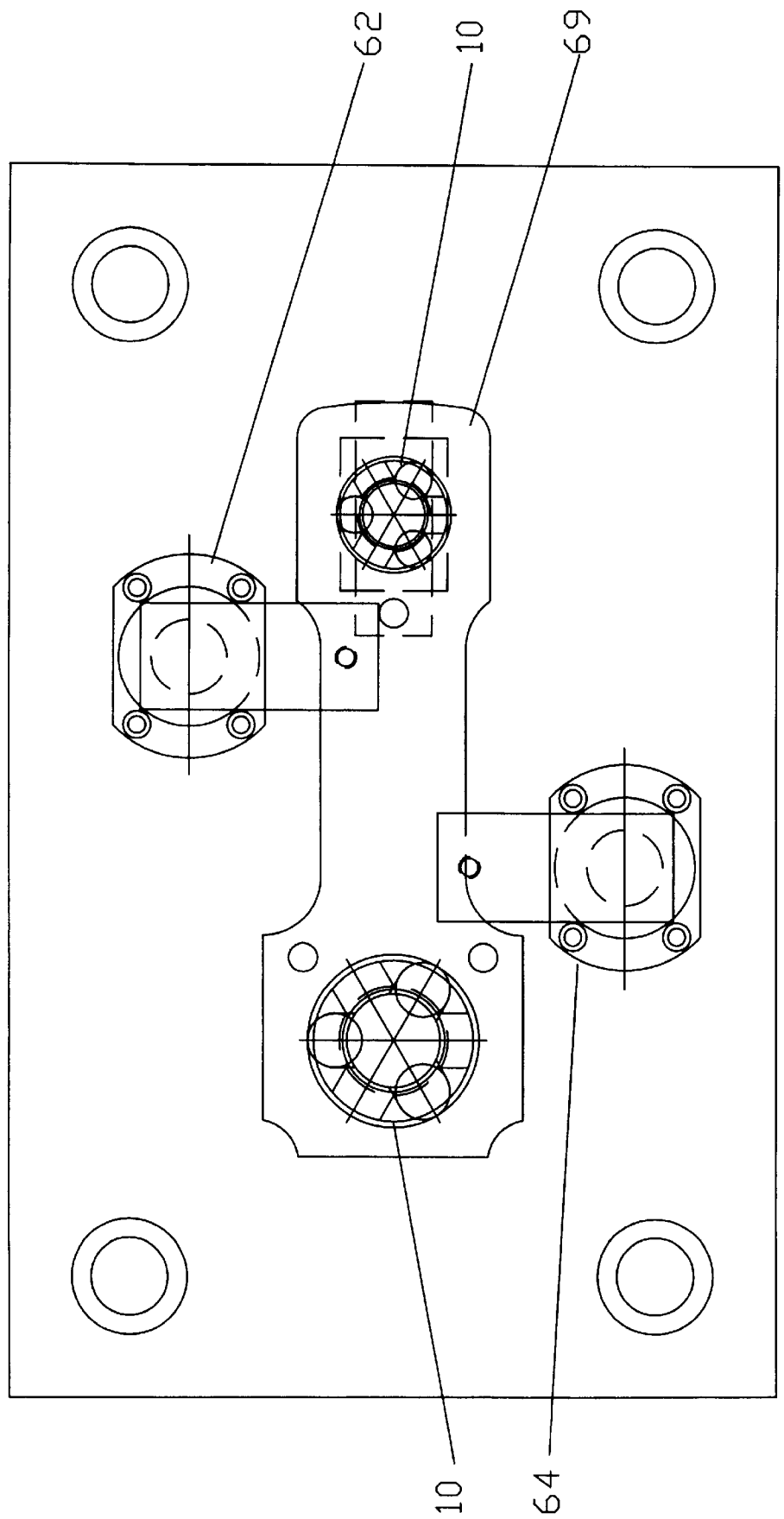
FIG. 11B is the top view of the same work piece table of FIGS. 11 and 11A with the locators in place and the work piece clamped into position.

FIGS. 11 and 11a shows the exact same assembly as in FIGS. 9 and 9a except there are two locators 10. Thus the whole work piece 69 can be located. These locators 10 work similar to the locator 10 in FIGS. 9 and 9a in that they can be lowered or raised. In this embodiment the work piece 69 is placed on a work piece table 63 with two openings 65 within it. The bores 67 to be located in the work piece 69 are placed over the two openings 65. The two locators 10 are attached to plate 60 underneath the work piece table 63. As in FIGS. 9 and 9a plate 60 is attached to the work piece table 63 in a way that allows it to move up and down. In the preferred embodiment plate 60 is attached to the legs 61 of the work piece table 63. The two locators 10 are then raised and passed through the openings 65 and locate the work piece 69 as shown in FIG. 10a. The work piece 69 is then fastened down to the table by holders 62 and 64 shown in FIG. 11b. The locators 10 are lowered and work can be done upon the work piece 67. It should be noted that in this embodiment there are only two locators 10 and only two locators 10 are necessary to locate a work piece. However, there could be many more locators if the work piece that needed to be measured or clamped to hold the work piece 69 in place.

FIG. 12 shows another embodiment of the locator 10. In this embodiment, the large sphere 28 has been replaced with a tapered nose plug 101. This plug 101 is cylindrical in shape with its nose being a truncated cone. This locator has a housing 30 as in the previous embodiments of the locator. The housing 30 has three openings or pockets 20, 22 and 24. Within these three pockets fits three small spheres, 12, 14, and 16. Upon these spheres 12, 14 and 16 is placed the tapered nose plug 101. As stated before, the tapered nose plug 101 is cylindrical in shape and approximately the same diameter as the inner diameter of the housing. The nose is a truncated cone. The conical sides fit up against the three small spheres 12, 14 and 16. As the three small spheres 12, 14 and 16 move in and out of the housing in the pockets 20, 22 and 24, the small spheres 12, 14 and 16 will put pressure upon the conical sides of the nose plug 101. When the three small spheres 12, 14 and 16 move inward, the nose plug 101 will move downward. As in the previous embodiment, between the nose plug 101 and the bottom of the housing 30 is a spring 26. The spring 26 puts pressure on the nose plug 101 which keeps the nose plug 101 in contact with the three small spheres 12, 14 and 16 and presses the three small spheres 12, 14 and 16 into the pockets 20, 22 and 24 in the housing 30 and forces the three small spheres 12, 14 and 16 to extend beyond the outer dimensions of the housing 30. As in the locators that use the large sphere 28, this locator can also be designed as a gauge to measure the size of a bore. As I pointed out above, as the three small spheres 12, 14 and 16 move in and out of the housing 30 the tapered nose plug 101 will move up and down. The locator shown in FIG. 12 is for a hydraulic system. Around the nose plug's cylindrical side rings 103 are placed between the nose plug 101 and the housing 30. This enables the nose plug 101 to work both as a locator and as a plunger for the hydraulic system.

The embodiment shown in FIG. 12 uses a hydraulic, pneumatic system similar to the embodiment of FIG. 6 only a tapered nose plug 101 has replaced the large sphere 28. In this embodiment as the smaller spheres 12, 14 and 16 move in and out, the tapered nose plug 101 moves up and down. The nose plug 101 is the plunger in a hydraulic cylinder. The nose plug 101 moves the hydraulic fluid. Thus, from the measurement of the fluid movement in the hydraulic system the movement of the three small spheres 12, 14 and 16 can be calculated.

This system can also be used as a clamping device in that by applying pressure to the fluid, the fluid will force the tapered nose plug 101 up and force the three small spheres 12, 14 and 16 outward to make frictional contact with the sides of the bore. The tapered nose plug 101 can also be used in a system in which a rod was attached to the bottom of the tapered nose plug 101 and this rod could be attached to the meter to measure the movement of the tapered nose plug 101 and thus the movement of the small spheres 12, 14 and 16. A system also using levelers as in FIG. 7 could be devised.

Figure 14:
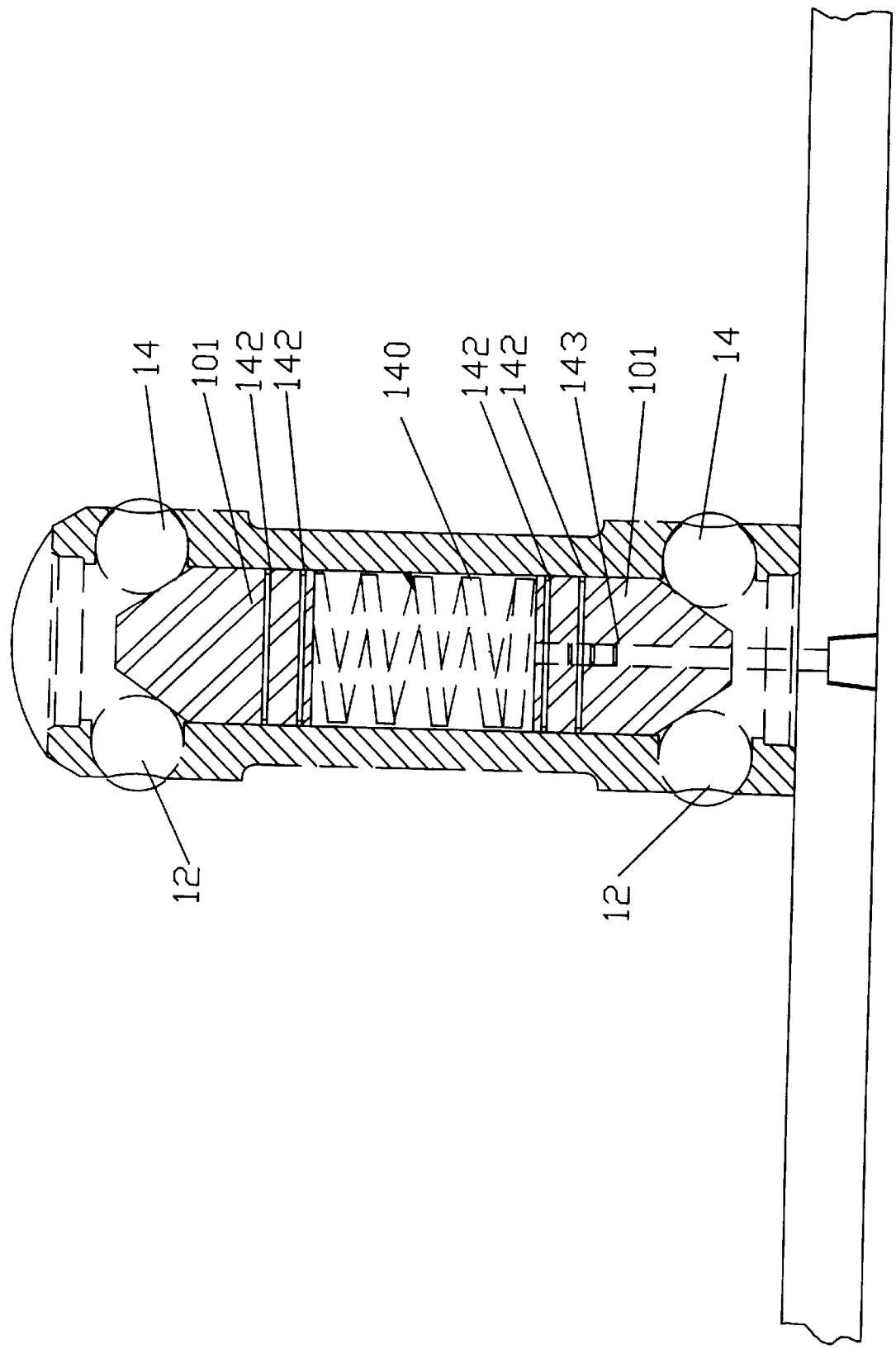
FIG. 14 shows the Self Locating Locator with tapered nose plugs used to measure the size of two bores.

FIGS. 13 and 14 show that the locators 10 can be placed one on top of the other. In FIG. 13, two locators 107 and 111 with the large sphere 128 and 129 are just placed bottom to bottom so that they can measure two different bores in the same axis. They could also be designed to measure two different bores of differing sizes on the same axis. In FIG. 13, the locator is designed as a gauge and the rod 105 for the top locator 107 passes through the center of the rod 109 for the lower locator 111. The rod 109 for the lower locator 111 makes contact with the lower large sphere 28. When the lower large sphere 128 moves up and down, the rod 109, which is attached to lever arm 113, moves up and down. At the other end of the lever arm 113, the lever arm 113 is attached to the gauge 34 which measures the movement of the lower sphere 128. The upper sphere 129 is attached to a rod 105. This rod 105 passes down through the top locator 111 into the bottom locator 107 and passes through the spring 26 of bottom locator and through an opening in the large sphere 128. It further passes through the central opening in the hollow rod 109. This rod 105 is also attached to a lever 117 arm at one end and the other end a lever arm is attached to a gauge 34 so that it can measure the movement of the upper large sphere 129.

FIG. 14 shows two locator gauges placed bottom to bottom using the tapered nose plug 101. These locators use a hydraulic system and thus do not need a solid bottom. In these locators a spring 140 is placed between the two tapered nose plugs 101. The bottom of each of the nose plugs 101 works as the bottom of the locator for other nose plugs 101. This system works on hydraulics and the bottom tapered nose plug 101 has an opening 143 in its center that passes through the nose plug 101 such that a hydraulic supply line can be attached to it and the fluid can flow between the nose plugs 101 in to the center of the locator. Both of the nose plugs 101 have rings 142 that seal to hold the hydraulic fluid in place. When the small spheres 12, 14 and 16 of each of the locators move in or out, the nose plugs 101 will move up and down and thus moving the fluid out. Each of the nose plugs 101 can move independent of the other, another words, the small spheres 12, 14 and 16 on top can move in and out and will not have an effect upon the small spheres 12, 14 and 16 at the bottom.

Figure 15:
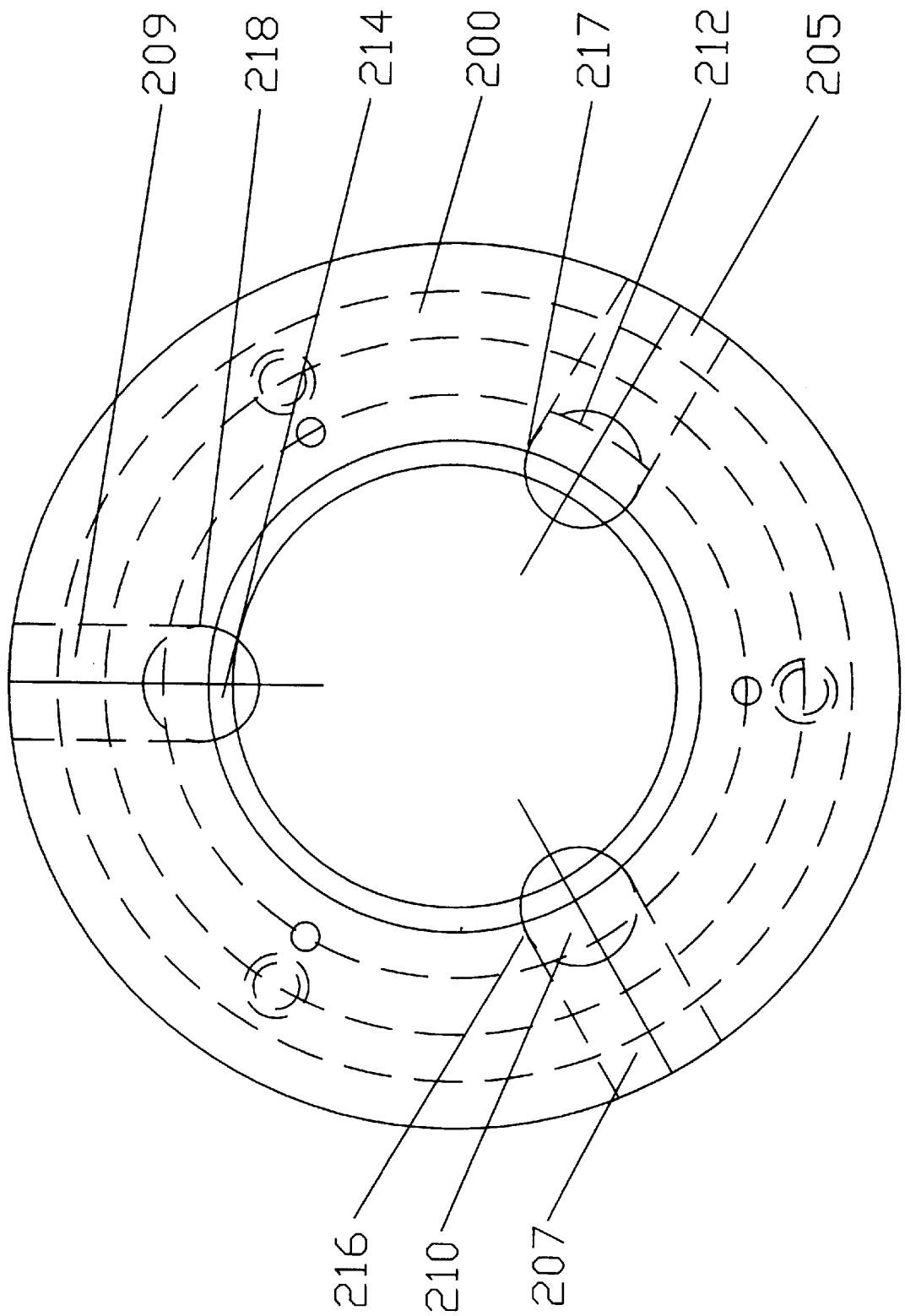
FIG. 15 is the top view of another embodiment of the Self Locating Locator used to locate a shaft or a cylinder.
Figure 16:
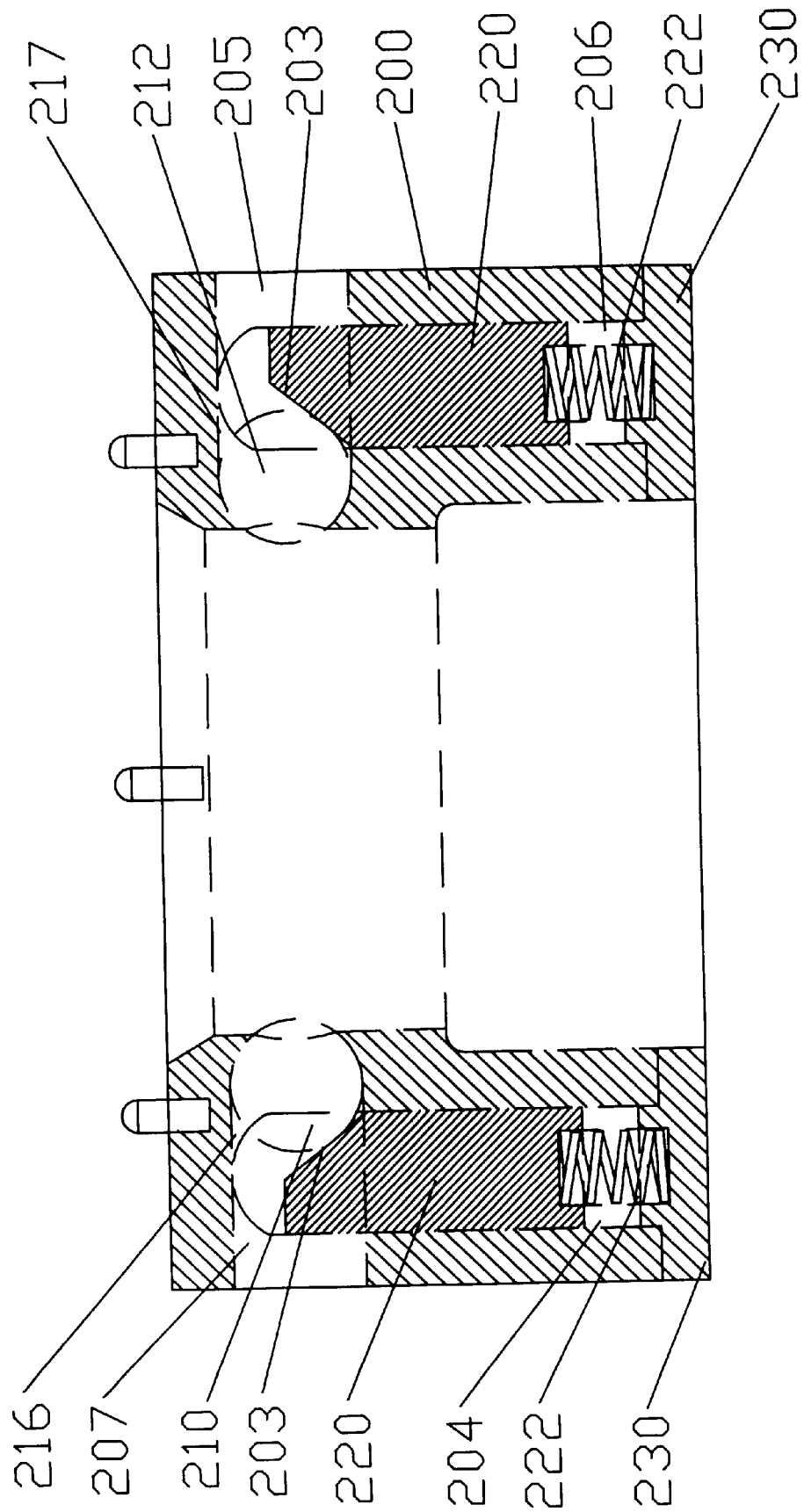
FIG. 16 is a cut away view of the Self Locating Locator of FIG. 15.

FIGS. 15 and 16 shows another embodiment of the invention. This embodiment is used to locate a shaft or a cylinder. It can be also used as a gauge or a clamp. In this embodiment a housing 200 is donut shaped with a flat top and bottom. In the bottom 202 of the housing three bottom openings 204, 206 and 208 (not shown) are bored 120 degrees apart. The openings do not pass all the way through the housing 200 from bottom to top. On the outer side of the donut at the top of each bottom opening 204, 206 and 208 a side opening 205, 207 and 209 is bored. These side openings 205, 207 and 209 pass through the bottom openings 204, 206 and 208 and passes completely through the housing 200. The side opening 216, 217 and 218 forms a pocket for a small sphere 210, 212 and 214 at housing inner edge 201. The three pockets 216, 217 and 218 are adapted to fit a small sphere 210, 212 and 214. Within the bottom opening 204, 206 and 208 a rod 220 is placed. Said rod 220 has at its top an angular face 203. This angular face 203 in the preferred embodiment is 45 degrees from vertical. The rods 220 diameter is nearly the same width as the inner diameter of the bottom opening 210, 212 and 214.

Figure 17:
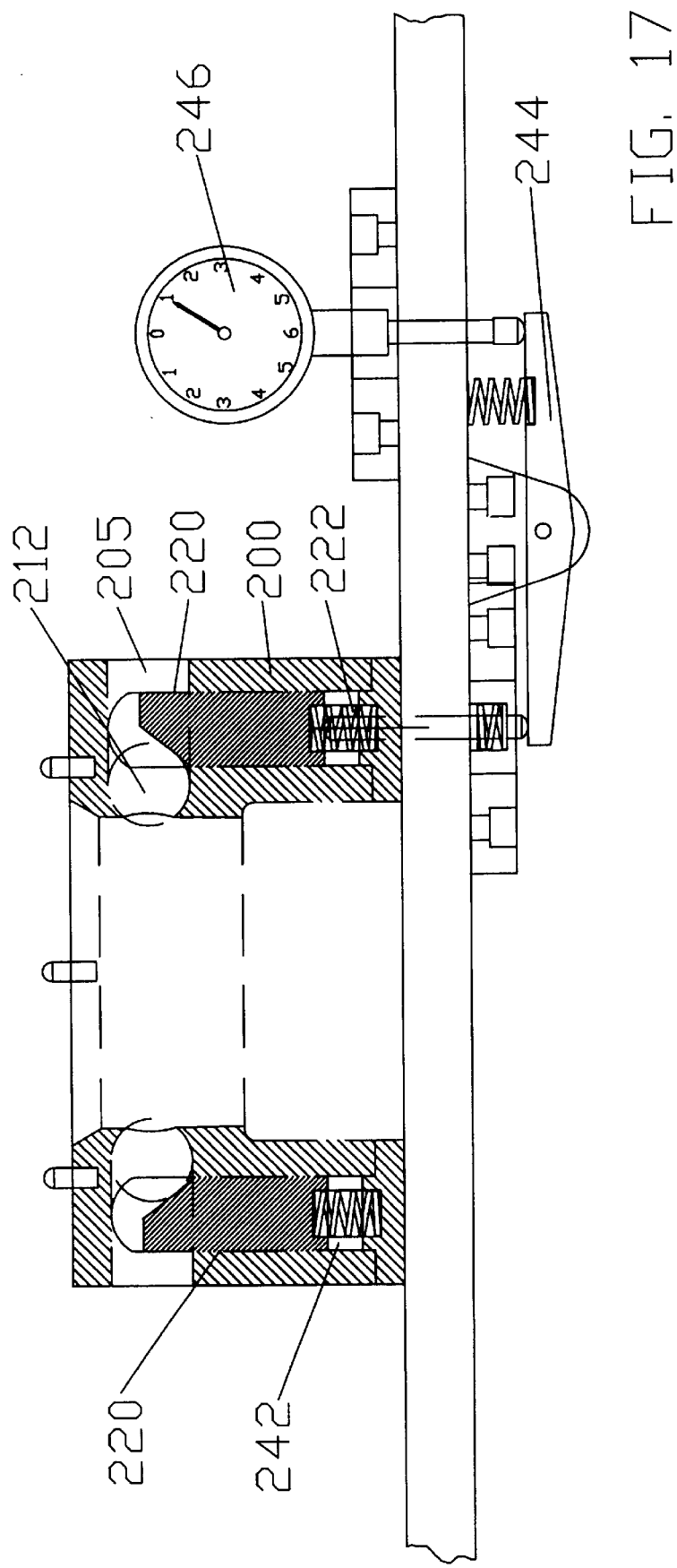
FIG. 17 is another cut away view of the Self Locating Locator of FIG. 15 with this embodiment of the Self Locating Locator used as a gauge.

To create the locator the three spheres 210, 212 and 214 are placed so that they fit within the pockets 211, 217 and 218 created by the side opening 205, 207 and 209. Then the rods 220, is fit in the bottom openings 205, 207 and 209. The angular face 203 faces up against the three spheres 210, 212 and 214. Then a spring 222 is placed against each of the rods 220 in the bottom opening 204, 206 and 208. Then a bottom 230 is placed upon the housing that holds the springs 222 in a compressed state pushing against the rods 220 and pushing the rods 220 up against the sphere 210, 212 and 214 and the sphere is then pushed out fully in the pocket 216, 217 and 218. When a shaft is ran through the center of the donut shaped housing 200, the shaft will put pressure on the spheres 210, 212 and 214 and forces the spheres 210, 212 and 214 inward. When the pressure is equal on all spheres 210, 212 and 214, the shaft is centered. FIG. 17 shows this type of locator being used as a gauge. In this figure, a bore 242 is attached to the rod 220 that fits within the bottom bore. When the sphere 212 move in and out the rod 220 moves up and down which moves the bar 242 which is attached to the bottom of the first rod 220 and attached to a lever arm 244. The lever arm 244 is then attached to a gauge 246 to measure the movement of the spheres 210, 212 and 214.

Figure 18:
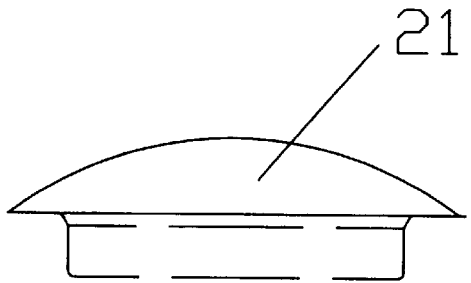
FIG. 18 is a side view of the plug that fits in the top of the Self Locating Locator.

FIG. 18 shows the plug 21 that fits on the top of the locator to keep dirt from getting into the locators main parts.

Figure 19:
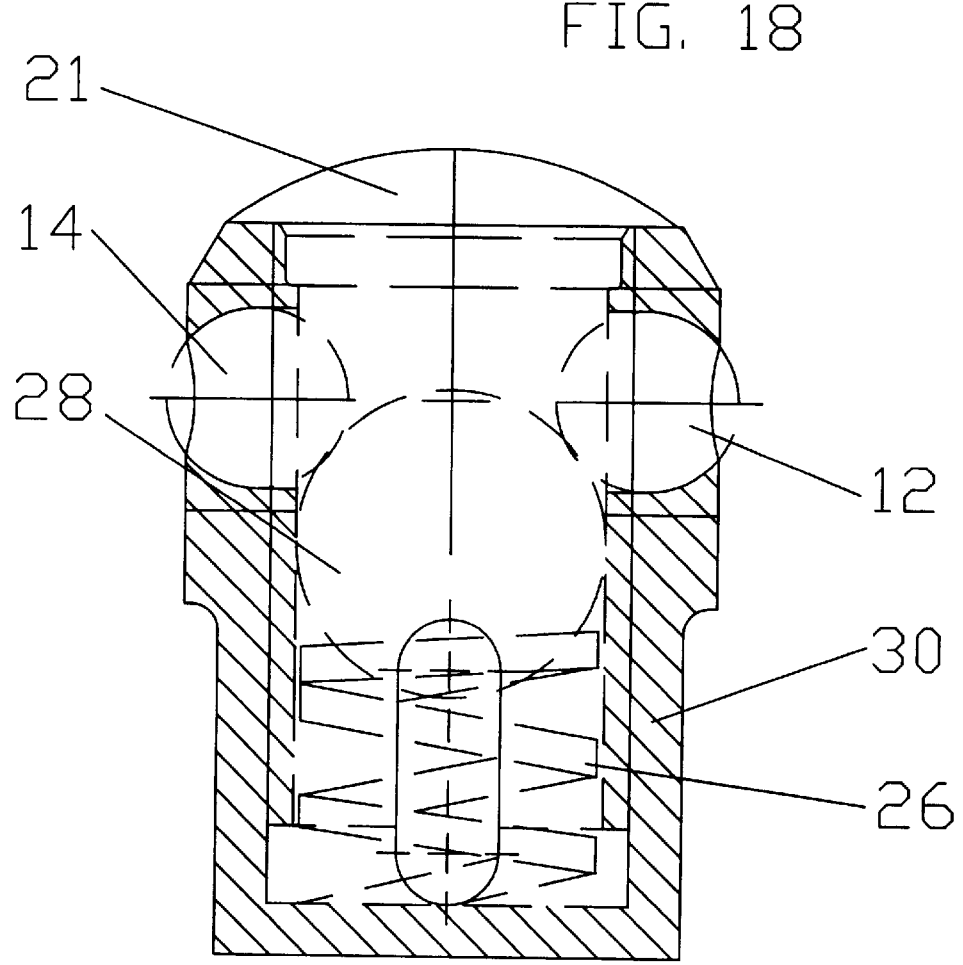
FIG. 19 is a cut away view of the Self Locating Locator with the plug of FIG. 18 in place.
Figure 20:
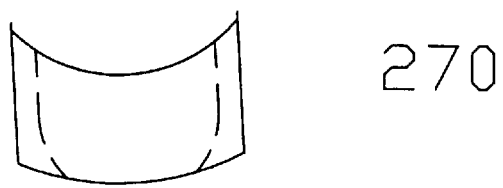
FIG. 20 is a side view of the small ball plug for the Self Locating Locator.

This plug 21 is placed on after the locator 10 has been assembled as shown in FIG. 19. FIG. 20 shows small ball plugs 270 that can be placed over the small balls to keep dirt from getting into the locator when the locator is not being used to locate a center.

The locator can be made out of almost any type of machineable material. It could be made out of any type of machineable metal, plastic, or ceramic. In the preferred embodiment the body is machine and the three openings for the three small balls are precisely machined. However, the main body could also be made by molding, casting, or pouring. The openings for the small balls can be placed in by machine inserts which are premanufactured to a finished state and the housing can be molded, cast or poured around these inserts.

Changes and modifications in the specificity described embodiments can be carried out without departing from the scope of the invention which is intended to limited only by the scope of the appending claims.

I claim:

1. A locator comprising:
   a. a first housing with a perimeter and a top with bores near the top of the housing; and,
   b. a compression means that is adapted to fit within the first housing; and,
   c. a first set of small spheres that are adapted to fit within the bores and extend outside the perimeter of the first housing; and,
   d. a first means for transferring the pressure of the compression means to the first set of small spheres equally that is adapted to fit within the first housing; and,
   e. the compression means is placed within the first housing and the means for transferring pressure is placed on top of the first compression means and the means for transferring pressure and the compression means are compressed to allow the first set of spheres to be placed within the bores such that the first compression means places pressure on the means for transferring pressure which holds the first set of small spheres within the bore and the first set of small spheres extends outside the perimeter of the first housing.

2. A locator as in claim 1 wherein:
   a. the compression means is spring.

3. A locator as in claim 1 wherein:
   a. the first means for transferring pressure of a compression means is a large sphere, and the large sphere fits on top of the compression means and makes contact with the smaller spheres.

4. A locator as in claim 3 further comprising:
   a. a means for measuring the movement of the large sphere.

5. A locator as in claim 4 wherein:
   a. the means for measuring the movement of the large sphere comprises:
      (1.) an opening in the housing; and,
      (2.) a rod adapted to fit through the opening in the housing and make contact with the large spheres; and,
      (3.) a gauge adapted to attach to the rod that measures the movement of the rod.

6. A locator as in claim 5 wherein:
   a. the means for measuring the movement of the large sphere further comprises:
   (1.) a lever attach to the rod at one end and attached to the meter at the other end such that when the rod moves the meter can measure the movement of the rod.

7. A locator as in claim 1 wherein:
   a. the first means for transferring pressure of the compression means is a plug whose outer diameter is approximately the same diameter as the housing inner diameter and said plug has a truncated cone shaped top that makes contact with the three smaller spheres and can transfer the pressure from the compression means equally to the three smaller spheres.

8. A locator as in claim 7 further comprising:
   a. a means for measuring the movement of the plug.

9. A locator as in claim 1 further comprising:
   a. a means for placing pressure in addition to the pressure of the compression means upon the means of transferring pressure which transfers this pressure to the spheres and forces the spheres outward; and whereby when the locator is placed in a bore which is within a work piece and the locator locates the bore's center, then the means for placing pressure in addition places additional pressure upon the means for transferring pressure and the small spheres forcing the small spheres against the surface of the bore and said pressure is sufficient to hold the work piece in place.

10. A locator as in claim 9 wherein:
    a. the means for placing additional pressure is an electrical-mechanical system.

11. A locator as in claim 9 wherein:
    a. the means for placing additional pressure is a hydraulic system.

12. A locator as in claim 1 further comprising:
    a. a cap that fits over the opening in the top of the housing to prevent dirt from getting into the locator.

13. A locator as in claim 1 further comprising:
    a. a second housing with a perimeter and a top with bores near the top of the housing; and,
    b. a second compression means that is adapted to fit within the second housing; and,
    c. a second set of small spheres that are adapted to fit within the bores and extend outside the perimeter of the second housing; and,
    d. a second means for transferring pressure of the second compression means to the second set of small spheres equally that is adapted to fit within the second housing; and,
    e. the second housing is adapted to attach to the first housing and the second compression means is placed within the second housing and the second means for transferring pressure is placed on top of the second compression means and the second means for transferring pressure and the second compression means are compressed to allow the second set of spheres to be placed within the bores such that the second compression means places pressure on the second means for transferring pressure which holds the second set of small spheres within the bores and the second set of small spheres extend outside the perimeter of the second housing.

14. A locator as in claim 13 further comprising:
    a. a means for measuring the movement of the first set of spheres; and,
    b. a means for measuring the movement of the second set of small spheres.

15. A locator as in claim 14 wherein:
    a. the means for measuring the movement of the first sphere comprises:
       (1.) a first opening in the first housing; and, (2.) a first rod adapted to fit through the opening in the first housing and make contact with the first large sphere; and, (3.) a first meter adapted to attach to the rod measures the movement of the first rod; and, b. the means for measuring the movement of the second sphere comprises:

(1.) a second rod adapted to fit through an opening in the first or second housing and make contact with the second large sphere; and, (2.) a second meter adapted to attach to the second rod that measures the movement of the second rod.

16. A locator as in claim 1 wherein:

a. the compression means is a hydraulic system.

17. A locator as in claim 1 wherein:

a. the compression means is an electrical-mechanical system.

18. a work station for working on a work piece comprising:

a. A table with a top and bottom and with a hole that passes from the top to the bottom of the table and said table and hole are adapted such that the work piece bore, which is to be located, is placed over the opening in the table; and, b. A plate attached underneath the work table such that the plate can be moved up and down; and, c. A locator with three balls which make contact with the work piece attached to the plate and said locator is adapted such that when the plate is moved up, the locator will pass through the hole in the table and be able to locate the bore in the work piece and when said plate is lowered, said locator will be lowered below the work piece.

19. A locator for a shaft comprising:

a. a donut shaped housing whose opening in the center is of a sufficient size to allow the shaft to pass through and has a top inner side, outer side and bottom; and, b. side openings that pass from the outer side to the inner side and said openings have an inner end and an outer end; and, c. bottom openings that pass from the bottom of the housing to each of the corresponding side openings; and, d. pockets bored into the inner side at the inner end of the side openings; and, e. spheres adapted to fit in the three pockets and are adapted to fit outside the perimeter of the inner side; and, f. a compression means that is adapted to fit within the bottom opening; and, g. a means for transferring pressure of the compression means to the set of small spheres equally that is adapted to fit within the bottom openings.

h. the spheres are fit in the pockets at the end of the openings and then the means for transferring pressure is fit within the bottom openings adapted in a position to hold the spheres in place, then the compression means is fit within the bottom openings such that it will place pressure on the means to transferring pressure and the means for transferring pressure will put equal pressure on each of the spheres, and then a bottom plate is placed upon the bottom of the housing to hold the spheres, the means for transferring pressure, the compression means in place.

20. A locator as in claim 1 further comprising:

a. a means for measuring the movement of the small spheres.

* * * * *